US012736768B2

(12) United States Patent
Hoshina et al.

(10) Patent No.: US 12,736,768 B2
(45) Date of Patent: Sep. 15, 2026

(54) LENS UNIT AND LENS ALIGNMENT METHOD

(71) Applicant: NIDEC INSTRUMENTS CORPORATION, Nagano (JP)

(72) Inventors: Yasuhiro Hoshina, Nagano (JP); Tadashi Komiyama, Nagano (JP)

(73) Assignee: NIDEC INSTRUMENTS CORPORATION, Nagano (JP)

(*) Notice: Subject to any disclaimer, the term of this patent is extended or adjusted under 35 U.S.C. 154(b) by 254 days.

(21) Appl. No.: 18/624,047

(22) Filed: Apr. 1, 2024

(65) Prior Publication Data

US 2024/0329356 A1 Oct. 3, 2024

(30) Foreign Application Priority Data

Apr. 3, 2023 (JP) ................................ 2023-059823

(51) Int. Cl.
*G02B 7/00* (2021.01)
*G02B 7/02* (2021.01)

(52) U.S. Cl.
CPC ............ *G02B 7/021* (2013.01); *G02B 7/003* (2013.01)

(58) Field of Classification Search
CPC . G02B 7/00; G02B 7/02; G02B 7/021; G02B 7/003; G02B 7/023; G02B 7/025; G02B 7/022
USPC .......................................................... 359/811
See application file for complete search history.

(56) References Cited

U.S. PATENT DOCUMENTS 6,392,819 B1 5/2002 Harada
8,736,989 B2 * 5/2014 Wu ........................ G02B 7/025 359/811
2006/0171046 A1 8/2006 Recco et al.
2009/0244726 A1 * 10/2009 Sakai ..................... G02B 7/021 359/819
2011/0298075 A1 * 12/2011 Teramoto ............... H04N 23/57 257/E31.127
2014/0078606 A1 * 3/2014 Wu ........................ G02B 7/025 359/827
2015/0198777 A1 * 7/2015 Yan ........................ G02B 7/003 359/793
2020/0049932 A1 * 2/2020 Wei ........................ G02B 7/022
2021/0018715 A1 * 1/2021 Fujii ...................... G02B 13/18
2021/0141291 A1 * 5/2021 Hirata .................... G02B 7/021
2021/0302805 A1 * 9/2021 Yoshida ................. G02B 7/025

(Continued)

FOREIGN PATENT DOCUMENTS

JP 2021005022 1/2021

*Primary Examiner* — William R Alexander
(74) *Attorney, Agent, or Firm* — JCIPRNET

(57) ABSTRACT

A lens unit includes a first lens and a second lens arranged in this order from an image side toward an object side. The second lens includes an annular contacting portion in contact with the first lens on an outer peripheral side of a lens surface on the image side. The first lens includes an annular contacted portion in contact with the contacting portion on an outer peripheral side of a lens surface on the object side. The contacting portion and the contacted portion are in line contact with each other. A contact line along which the contacting portion and the contacted portion are in contact with each other has an annular shape coaxial with an optical axis of the first lens and is located on a virtual perpendicular plane that is perpendicular to the optical axis of the first lens.

11 Claims, 13 Drawing Sheets

(56) References Cited

U.S. PATENT DOCUMENTS

| | | | | |
|---|---|---|---|---|
| 2022/0377214 | A1* | 11/2022 | Ohara | G03B 43/00 |
| 2024/0402470 | A1* | 12/2024 | Komiyama | G02B 13/006 |
| 2025/0328008 | A1* | 10/2025 | Sakaguchi | G03B 17/02 |

* cited by examiner

LENS UNIT AND LENS ALIGNMENT METHOD

CROSS-REFERENCE TO RELATED APPLICATION

This application claims the priority benefit of Japan application no. 2023-059823, filed on Apr. 3, 2023. The entirety of the above-mentioned patent application is hereby incorporated by reference herein and made a part of this specification.

BACKGROUND

Field of the Invention

At least an embodiment of the present invention relates to a lens unit including two lenses in contact with each other in an optical axis direction.

Description of Related Art

Japanese Unexamined Patent Publication No. 2021-005022 discloses such a lens unit. In this document, a sixth lens located closest to the image side and a fifth lens located on the object side are housed in a lens barrel in a state where the lenses are in contact with each other. The sixth lens is a cemented lens. The fifth lens is press-fitted into a center hole of an annular holder.

The sixth lens includes an annular protruding portion on an outer peripheral side of a lens surface on the object side. The annular protruding portion includes, at the top, a top surface perpendicular to an optical axis. A lens barrel is in contact with the sixth lens from outside in the radial direction. Thus, the sixth lens is positioned in the radial direction. Further, an annular support surface provided at an inner peripheral surface of the lens barrel abuts the sixth lens from the image side. Thus, the sixth lens is positioned in the optical axis direction.

The fifth lens includes a lens body portion including a lens surface and a flange portion surrounding the lens body portion from the outer peripheral side. The flange portion includes, on the image side, an annular perpendicular surface that is perpendicular to the optical axis. The fifth lens is positioned in the radial direction via the holder as the inner peripheral surface of the lens barrel is in contact with the holder from outside in the radial direction. Further, the fifth lens is placed on the sixth lens and is positioned in the optical axis direction as the top surface of the annular protruding portion of the sixth lens is in surface contact with the perpendicular surface.

In the above-described lens unit, the fifth lens is positioned in the radial direction via the holder. Therefore, the accuracy of positioning the holder in the lens barrel affects the accuracy of alignment between the sixth lens and the fifth lens.

The present provides a lens unit in which two adjacent lenses are aligned only by contact of the two lenses. Furthermore, at least an embodiment of the present invention provides an alignment method for accurately aligning two lenses in contact with each other.

SUMMARY

A lens unit according to at least an embodiment of the present invention includes a first lens and a second lens arranged in this order from an image side toward an object side, the second lens includes an annular contacting portion in contact with the first lens on an outer peripheral side of a lens surface on the image side, the first lens includes an annular contacted portion in contact with the contacting portion on an outer peripheral side of a lens surface on the object side, the contacting portion and the contacted portion are in line contact with each other, and a contact line along which the contacting portion and the contacted portion are in contact with each other has an annular shape coaxial with an optical axis of the first lens and is located on a virtual perpendicular plane that is perpendicular to the optical axis of the first lens.

According to at least an embodiment of the present invention, the first lens and the second lens are in contact with each other at the annular contact line. The contact line is located on the virtual perpendicular plane that is perpendicular to the optical axis of the first lens. Thus, the first lens and the second lens may be aligned with high accuracy.

According to at least an embodiment of the present invention, a cross-section of the contacting portion cut along the optical axis may be an arc that is curved to the object side toward the outer peripheral side, and the contacted portion may be a tapered surface extending to the object side toward the outer peripheral side. Thus, the first lens and the second lens may be brought into line contact with each other.

According to at least an embodiment of the present invention, in the second lens, the lens surface on the image side and the contacting portion may be continuous with each other without a step.

According to at least an embodiment of the present invention, the first lens and the second lens may be fixed to each other with a first adhesive layer provided between the first lens and the second lens on an outer peripheral side of the contact line. That is, the second lens may be fixed to the first lens with an adhesive.

According to at least an embodiment of the present invention, a lens barrel to house the first lens and the second lens inside may be included, the lens barrel may include, on an inner peripheral surface, a plurality of first fitting projections that projects to an inner peripheral side from a first inner peripheral surface portion located outside the first lens in a radial direction and is pressure-bonded to the first lens, the first lens may be positioned in the radial direction by the plurality of first fitting projections, and the second lens may face the inner peripheral surface of the lens barrel with a clearance. That is, the first lens is positioned in the radial direction by the first fitting projection provided at the inner peripheral surface of the lens barrel, but the second lens is not in contact with the lens barrel. Thus, the second lens may be positioned only by line contact with the first lens.

According to at least an embodiment of the present invention, a third lens provided on the object side of the second lens and an annular holder provided on an outer peripheral side of the second lens may be included, the first lens may be supported from the image side at a predetermined position in an optical axis direction along the optical axis of the first lens, the lens barrel may include, on the inner peripheral surface, a plurality of second fitting projections that projects to the inner peripheral side from a second inner peripheral surface portion located outside the holder in the radial direction and is pressure-bonded to the holder, the holder may be stacked on the object side of the first lens and positioned in the radial direction by the plurality of second fitting projections, a clearance may be provided between the second lens and an inner peripheral surface of the holder, the second lens may be fixed to the holder with a second adhesive layer provided in the clearance, and the third lens may be stacked on the object side of the holder. Thus, the holder located on the outer peripheral side of the second lens is positioned in the radial direction by the second fitting projection on the inner peripheral surface of the lens barrel, but there is a clearance between the holder and the second lens. Therefore, the positioning accuracy of the holder in the lens barrel does not affect the position of the second lens in the radial direction. Here, the holder is stacked on the object side of the first lens, and the third lens is stacked on the object side of the holder. Therefore, the holder functions as a member that positions the third lens in the optical axis direction.

Next, according to at least an embodiment of the present invention, a lens alignment method for aligning a first lens and a second lens adjacent to each other in an optical axis direction includes: providing an annular contacting portion in contact with the first lens on an outer peripheral side of a lens surface of the second lens on the first lens side and providing an annular contacted portion in contact with the contacting portion on an outer peripheral side of a lens surface of the first lens on the second lens side, bringing the contacting portion and the contacted portion into line contact with each other; and vibrating one of the first lens and the second lens until an annular contact line along which the contacting portion and the contacted portion are in contact with each other is located on a virtual perpendicular plane that is coaxial with an optical axis of the first lens and is perpendicular to the optical axis, a cross-section of the contacting portion cut along the optical axis is an arc that is curved in a direction away from the first lens toward the outer peripheral side, and the contacted portion is a tapered surface extending to the second lens side toward the outer peripheral side.

According to at least an embodiment of the present invention, the first lens and the second lens are stacked, the contacting portion provided at the first lens and the contacted portion provided at the second lens are brought into line contact with each other, and one of the first lens and the second lens is vibrated. Here, the cross-section of the contacting portion of the second lens cut along the optical axis is an arc that is curved in a direction away from the first lens toward the outer peripheral side, and the contacted portion of the first lens is a tapered surface extending to the second lens side toward the outer peripheral side. Therefore, one of the first lens and the second lens is vibrated, and thus the first lens and the second lens may be relatively moved to align the two lenses.

According to at least an embodiment of the present invention, after the annular contact line along which the contacting portion and the contacted portion are in contact with each other is located on the virtual perpendicular plane, which is perpendicular to the optical axis of the first lens, an adhesive may be applied between the first lens and the second lens on an outer peripheral side of the contact line to fix the first lens and the second lens.

Further, according to at least an embodiment of the present invention, after bringing the contacting portion and the contacted portion into line contact with each other, an adhesive may be applied between the first lens and the second lens on the outer peripheral side of the contact line, one of the first lens and the second lens may be subsequently vibrated until the annular contact line along which the contacting portion and the contacted portion are in contact with each other is located on the virtual perpendicular plane that is perpendicular to the optical axis of the first lens, and then the adhesive may be cured.

With the lens unit according to at least an embodiment of the present invention, the first lens and the second lens are in contact with each other at the annular contact line. The contact line is located on the virtual perpendicular plane that is perpendicular to the optical axis of the first lens. Thus, the first lens and the second lens may be aligned with high accuracy.

With the lens alignment method according to at least an embodiment of the present invention, the first lens and the second lens are stacked, the contacting portion provided at the first lens and the contacted portion provided at the second lens are brought into line contact with each other, and one of the first lens and the second lens is vibrated. Here, the cross-section of the contacting portion of the second lens cut along the optical axis is an arc that is curved in a direction away from the first lens toward the outer peripheral side, and the contacted portion of the first lens is a tapered surface extending to the second lens side toward the outer peripheral side. Therefore, one of the first lens and the second lens is vibrated, and thus the first lens and the second lens may be relatively moved to align the two lenses.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

An embodiment of a lens unit to which at least an embodiment of the present invention is applied will be described below with reference to the drawings.

Optical System

Figure 1:
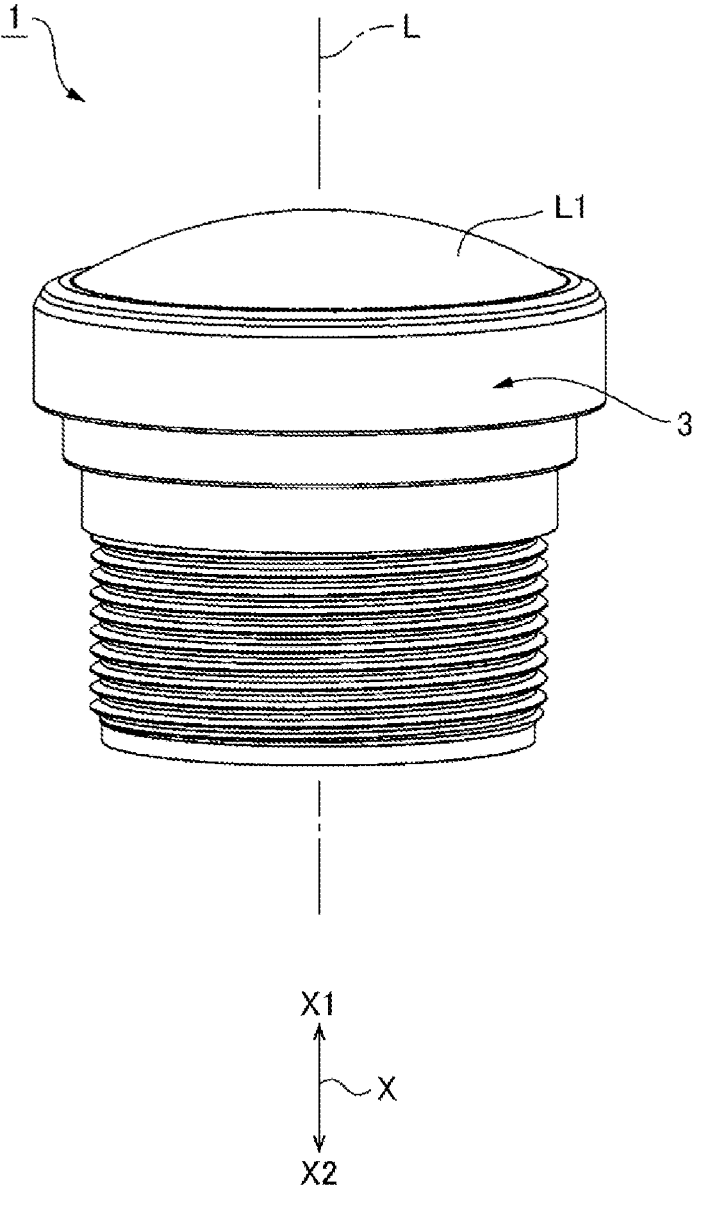
FIG. 1 is an external perspective view of a lens unit to which at least an embodiment of the present invention is applied.
Figure 2:
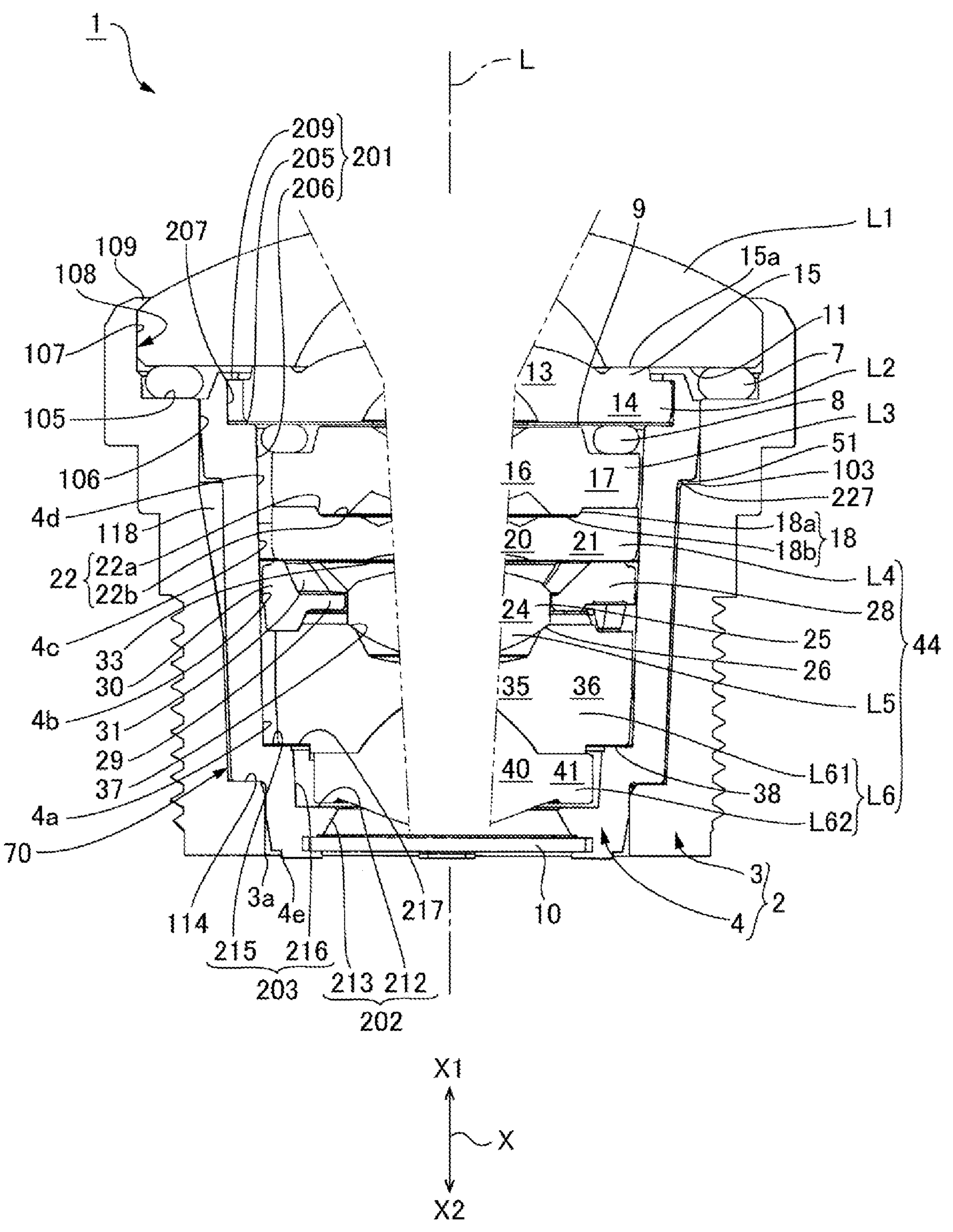
FIG. 2 is a cross-sectional view of the lens unit.
Figure 3:
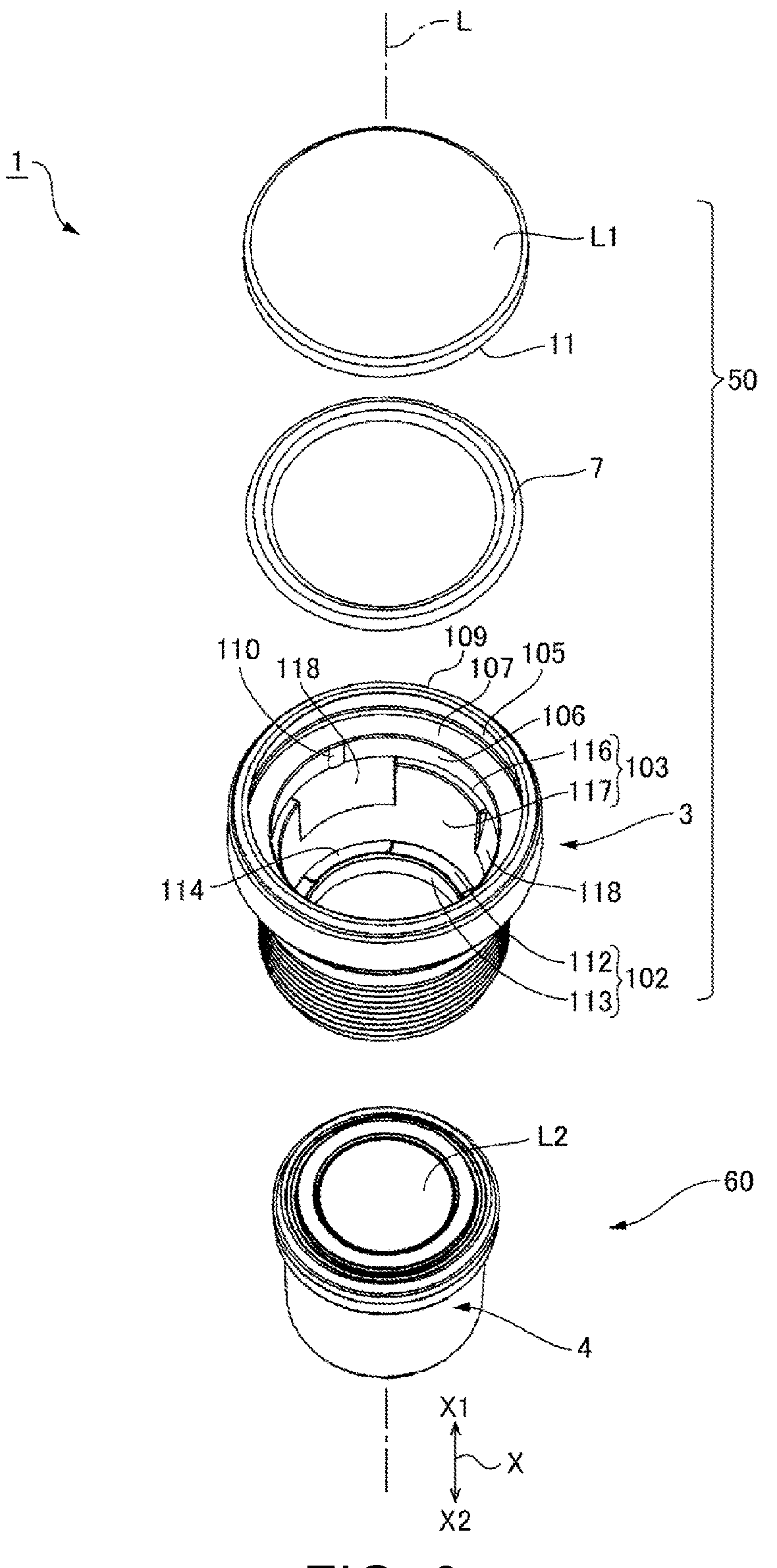
FIG. 3 is an exploded perspective view of the lens unit.
Figure 4:
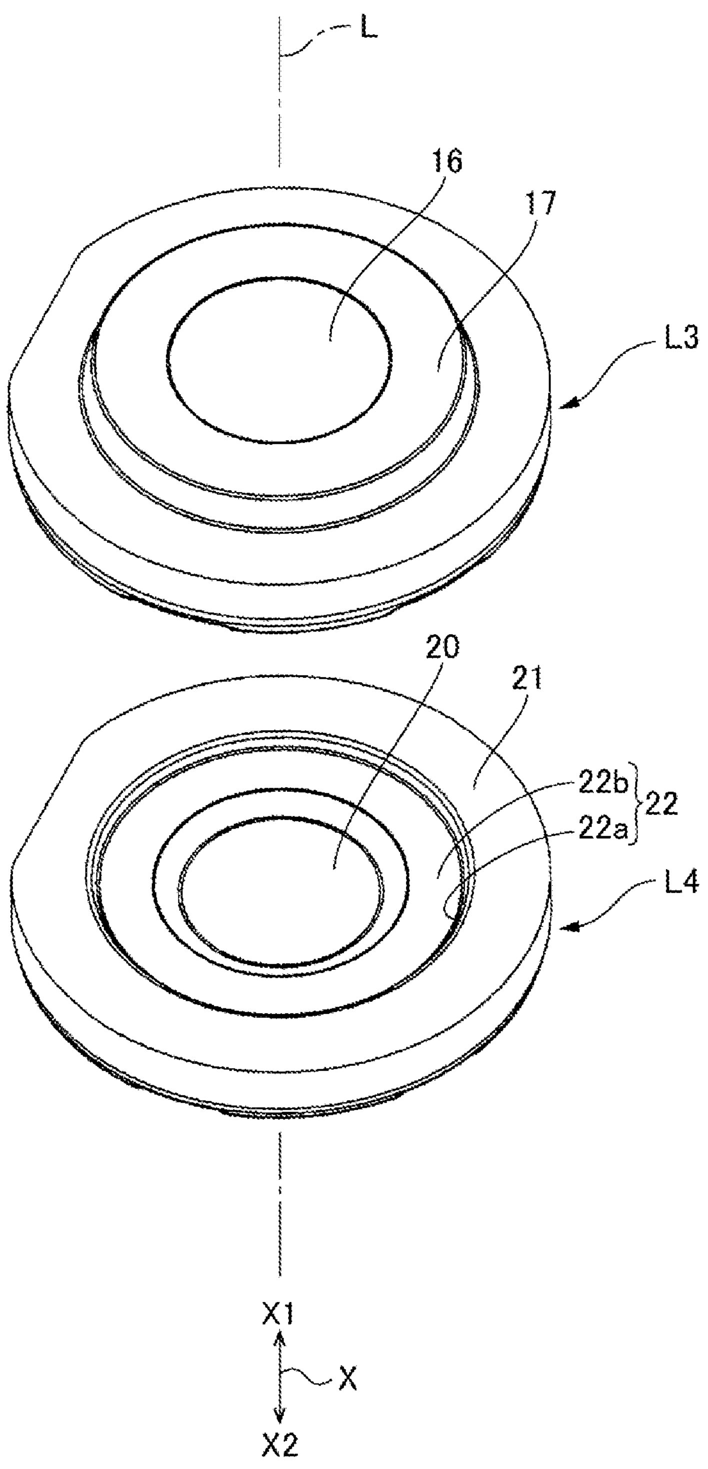
FIG. 4 is an exploded perspective view of a lens L3 and a lens L4 when viewed from an object side.
Figure 5:
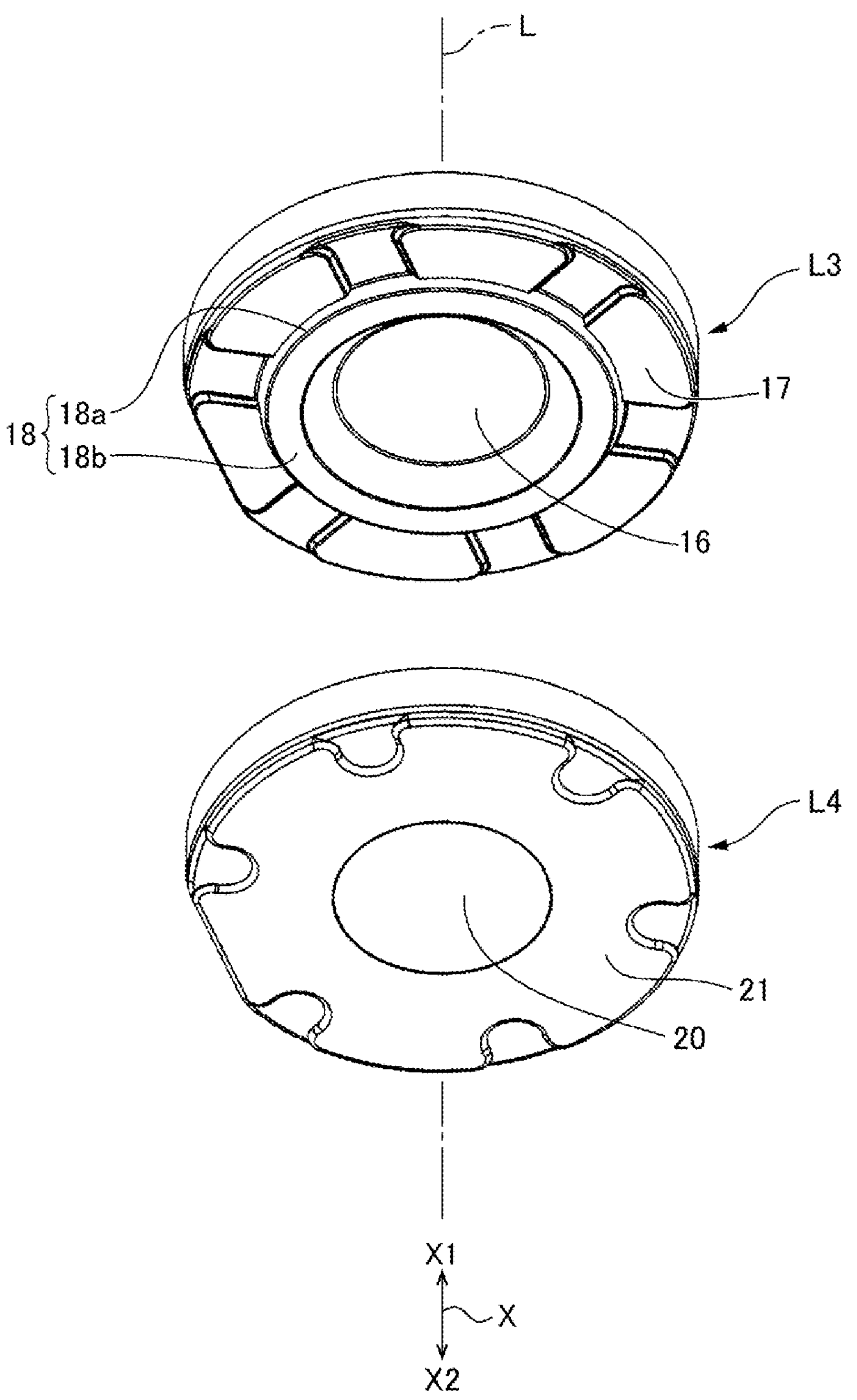
FIG. 5 is an exploded perspective view of the lens L3 and the lens L4 when viewed from an image side.
Figure 6:
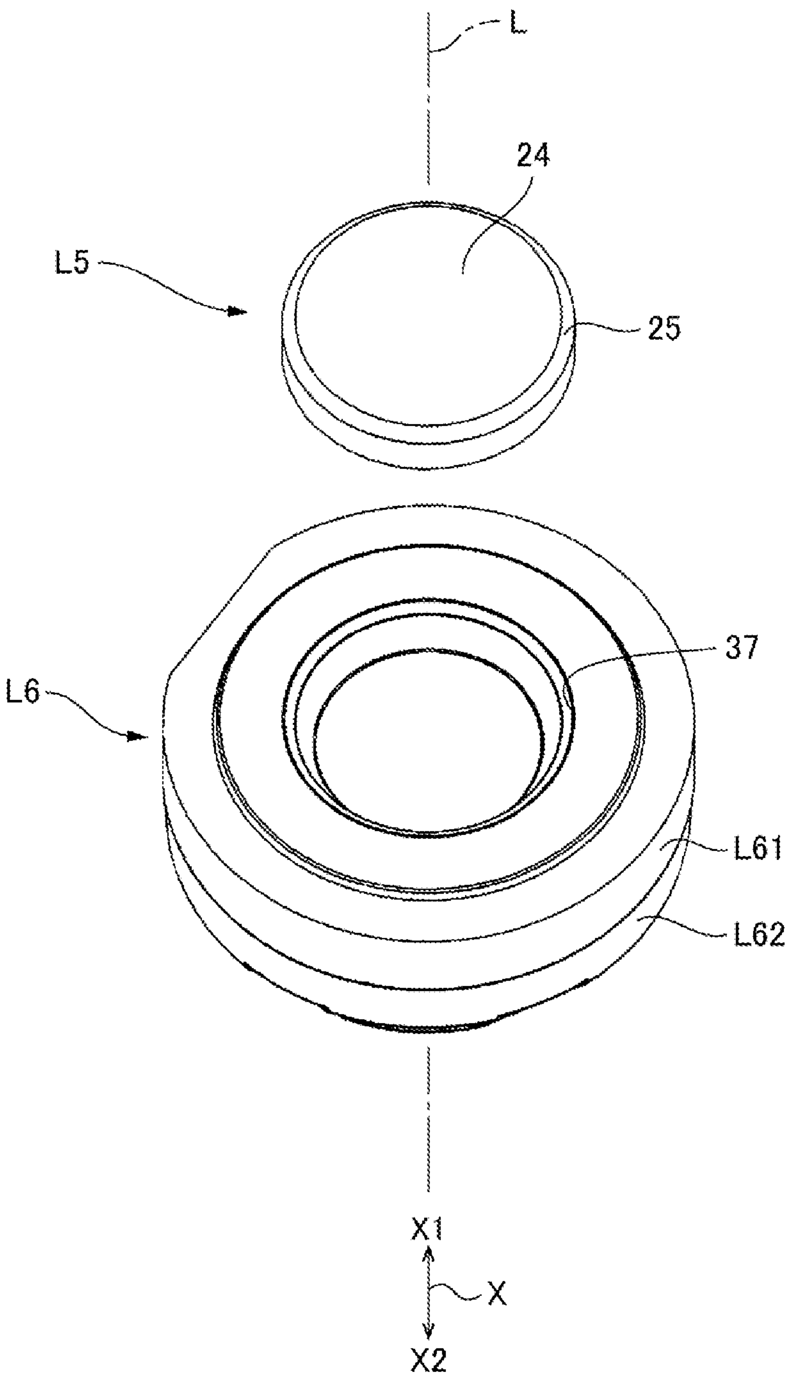
FIG. 6 is an exploded perspective view of a lens L5 and a lens L6 when viewed from the object side.

FIG. 1 is an external perspective view of a lens unit to which at least an embodiment of the present invention is applied. FIG. 2 is a cross-sectional view of the lens unit. FIG. 3 is an exploded perspective view of the lens unit. FIG. 4 is an exploded perspective view of a lens L3 and a lens L4 when viewed from an object side. FIG. 5 is an exploded perspective view of the lens L3 and the lens L4 when viewed from an image side. FIG. 6 is an exploded perspective view of a lens L5 and a lens L6 when viewed from the object side.

Figure 7:
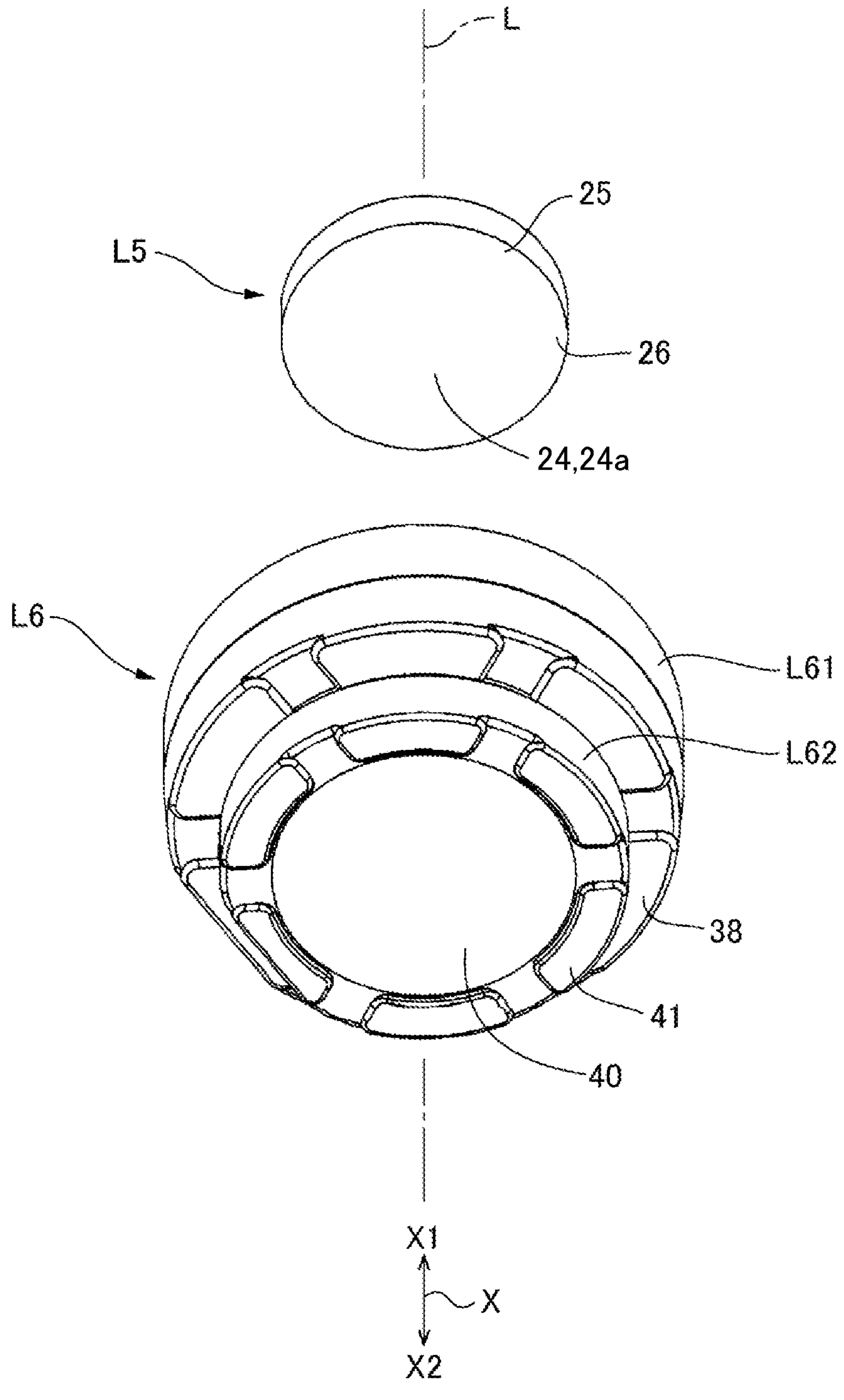
FIG. 7 is an exploded perspective view of the lens L5 and the lens L6 when viewed from the image side.
Figure 8:
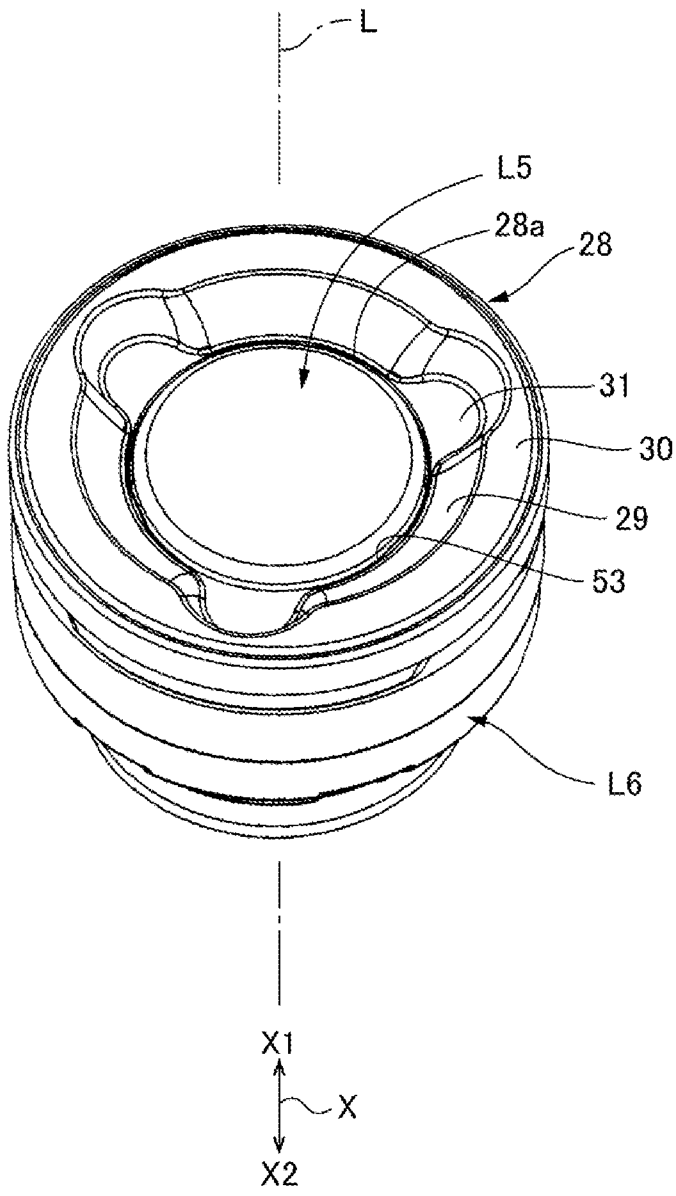
FIG. 8 is a perspective view of a holder, the lens L5, and the lens L6.

FIG. 7 is an exploded perspective view of the lens L5 and the lens L6 when viewed from the image side. FIG. 8 is a perspective view of a holder, the lens L5, and the lens L6. In FIG. 2, the shape of each lens in a region (around the optical axis) between two dash-dot-dot lines is omitted.

A lens unit 1 according to this example illustrated in FIG. 1 is used in an image capturing device mounted on an automobile or a surveillance camera. As illustrated in FIG. 2, the lens unit 1 includes a lens L1, a lens L2, the lens L3, the lens L4, the lens L5, and the lens L6 in this order from the object side to the image side. The lens L6 is a cemented lens and includes an object-side lens L61 and an image-side lens L62 in this order from the object side to the image side. Further, the lens unit 1 includes, as a lens barrel 2, a first lens barrel 3 and a second lens barrel 4 held on an inner peripheral side of the first lens barrel 3. The first lens barrel 3 houses the lens L1. The second lens barrel 4 houses the lens L2 to the lens L6. The second lens barrel 4 is held on the inner peripheral side of the first lens barrel 3.

As illustrated in FIG. 3, the lens L1 and the first lens barrel 3 constitute a first unit 50. The lenses L2 to L6 and the second lens barrel 4 constitute a second unit 60. Hereinafter, a direction along an optical axis L of the lens L1 is referred to as an optical axis direction X. The optical axis L of the lens L1 is the optical axis L of the lens unit 1. An object side X1 in the optical axis direction X is the side where the lens L1 is located, and an image side X2 is the side where the lens L6 is located.

As illustrated in FIG. 2, the lens L1 has an outer diameter dimension greater than the lens L2 to the lens L6. In this example, the lens L1 is made of glass. The lens L1 is a meniscus lens having a convex shape on the object side X1. The lens L1 includes an annular end surface 11 spreading in a direction perpendicular to the optical axis L on the outer peripheral side of a lens surface on the image side X2. A first O-ring 7 is provided on the image side X2 of the end surface 11 of the lens L1.

The lens L2 is made of resin. The lens L2 includes a lens body portion 13 including a lens surface and a flange portion 14 surrounding the lens body portion 13. The lens L2 is a meniscus lens having a convex shape on the object side X1. An annular protruding portion 15 protruding to the object side X1 is provided at an end surface of the flange portion 14 on the object side X1. The top of the annular protruding portion 15 is an annular contacting portion 15*a* in surface contact with the end surface of the lens L1.

As illustrated in FIGS. 2, 4, and 5, the lens L3 is made of resin. The lens L3 includes a lens body portion 16 including a lens surface and a flange portion 17 surrounding the lens body portion 16. The lens L3 is a meniscus lens having a convex shape on the image side X2. As illustrated in FIG. 5, an annular fitting portion 18 protruding to the object side X1 is provided at the end surface of the flange portion 17 on the image side X2. The fitting portion 18 includes a fitting portion tapered surface 18*a*, which surrounds the optical axis L and is inclined to the inner peripheral side toward the image side X2, and a fitting portion end surface 18*b*, which extends perpendicular to the optical axis L toward the inner peripheral side from an end of the fitting portion tapered surface 18*a* on the image side X2.

Here, as illustrated in FIG. 2, an elastic member is provided between the lens L2 and the lens L3 in the optical axis direction X. The elastic member is a second O-ring 8. The second O-ring 8 is compressed in the optical axis direction X between the flange portion 14 of the lens L2 and the flange portion 17 of the lens L3. In this example, a resin-made light shielding sheet 9 is provided between the lens L1 and the lens L2 in the optical axis direction X. The light shielding sheet 9 is annular. The second O-ring 8 is located between the light shielding sheet 9 and the lens L3.

The lens L4 is made of resin. As illustrated in FIGS. 2, 4, and 5, the lens L4 includes a lens body portion 20 including a lens surface and a flange portion 21 surrounding the lens body portion 20. The lens surface of the lens body portion 20 of the lens L4 on the object side X1 is a curved surface that projects to the object side X1. The lens surface of the lens body portion 20 on the image side X2 includes, at the center, a curved surface portion protruding to the image side X2.

As illustrated in FIG. 4, a fitted portion 22 into which the fitting portion 18 of the lens L3 is fitted is provided at the end surface of the flange portion 21 on the object side X1. The fitted portion 22 includes a fitted portion tapered surface 22*a*, which surrounds the optical axis L and is inclined to the inner peripheral side toward the image side X2, and a fitted portion end surface 22*b*, which extends perpendicular to the optical axis L toward the inner peripheral side from the end of the fitted portion tapered surface 22*a* on the image side X2. As illustrated in FIG. 2, the fitting portion tapered surface 18*a* of the lens L3 and the fitted portion tapered surface 22*a* of the lens L4 are in surface contact with each other. The fitting portion end surface 18*b* of the lens L3 and the fitted portion end surface 22*b* of the lens L4 are separated from each other in the optical axis direction X. In this example, the end surface on the image side X2 of the outer peripheral portion of the fitting portion 18 in the flange portion 17 of the lens L3 and the end surface on the object side X1 of the outer peripheral portion of the fitted portion 22 in the flange portion 21 of the lens L4 are in contact with each other in the optical axis direction X. Thus, the lens L3 is placed on the lens L4, and the lens L3 is positioned in the optical axis direction X.

The lens L5 is made of glass. As illustrated in FIG. 2, the lens L5 has an outer diameter dimension smaller than the lens L2, the lens L3, the lens L4, and the lens L6. The lens L5 includes a lens body portion 24 including a lens surface and a flange portion 25 surrounding the lens body portion 24. The lens L5 is a biconvex lens. As illustrated in FIGS. 2 and 7, the image side X2 of the flange portion 25 is a contacting portion 26 in contact with the lens L6 from the object side X1. A cross-section of the contacting portion 26 cut along the optical axis Lis an arc that is curved to the object side X1 toward the outer peripheral side. As illustrated in FIG. 7, the surface of the contacting portion 26 on the image side X2 is continuous with the outer peripheral end of the lens surface 24*a* of the lens body portion 24 on the image side X2 without a step.

As illustrated in FIG. 2, a holder 28 made of resin is provided outside the lens L5 in the radial direction. As illustrated in FIG. 8, the holder 28 is annular. The holder 28 includes a central portion 29 adjacent to the lens L5 with a clearance 28*a* in the radial direction and an outer peripheral portion 30 that is thicker in the optical axis direction X than the central portion 29 on the outer peripheral side of the central portion 29. The surface of the central portion 29 on the object side X1 is inclined to the image side X2 from the outer peripheral portion 30 toward the inner peripheral side. At three positions in the circumferential direction of the central portion 29 and the outer peripheral portion 30, cutout portions 31, which are cut out from the object side X1 and the inner peripheral side, are provided. A bottom surface (a surface facing the object side X1) of the cutout portion 31 is continuous with an end edge on the inner peripheral side of the central portion 29.

Here, a diaphragm 33 is provided between the lens L4 and the lens L5. The diaphragm 33 is an annular sheet that is sandwiched between the lens L4 and the holder 28 and is supported at a predetermined position in the optical axis direction X.

The lens L6 is made of resin. Specifically, both the object-side lens L61 and the image-side lens L62 are made of resins. As illustrated in FIG. 2, the object-side lens L61 includes a lens body portion 35 including a lens surface and a flange portion 36 surrounding the lens body portion 35. A lens surface of the object-side lens L61 on the object side X1 is a curved surface that is curved to the image side X2, and a lens surface on the image side X2 is a curved surface that is recessed to the object side X1.

As illustrated in FIG. 6, the flange portion 36 of the object-side lens L61 includes, on the object side X1, a contacted portion 37 in contact with the contacting portion 26 of the lens L5. The contacted portion 37 is a tapered surface extending to the object side X1 toward the outer peripheral side. The contacting portion 26 and the contacted portion 37 are in line contact with each other. A contact line M along which the contacting portion 26 and the contacted portion 37 are in contact with each other has an annular shape coaxial with the optical axis L and is located on a virtual perpendicular plane S that is perpendicular to the optical axis L (see FIG. 12 described below). Furthermore, the flange portion 36 of the object-side lens L61 includes an annular end surface 38 perpendicular to the optical axis L on the image side X2.

The image-side lens L62 includes a lens body portion 40 including a lens surface and a flange portion 41 surrounding the lens body portion 40. A lens surface of the image-side lens L62 on the object side X1 is a curved surface protruding to the object side X1, and a lens surface on the image side X2 is a curved surface protruding to the object side X1. The image-side lens L62 is fixed to the object-side lens L61. The outer diameter dimension of the image-side lens L62 is smaller than the outer diameter dimension of the object-side lens L61. Therefore, as illustrated in FIG. 7, when viewed from the image side X2, the flange portion 36 of the object-side lens L61 has a portion protruding from the image-side lens L62 to the outer peripheral side.

Here, as illustrated in FIG. 2, the lens L5 is stacked on the lens L6. Further, the lens L4 is stacked on the lens L6 via the holder 28. The lens L4, the holder 28, the lens L5, and the lens L6 constitute a stacked body 44. The lens L3 is stacked on the lens L4. Specifically, the lens L3 is stacked on the stacked body 44. Further, a plate-shaped cover 10 is provided on the image side X2 of the lens L6.

Lens Barrel

As illustrated in FIGS. 2 and 3, the lens unit 1 includes, as the lens barrel 2, the first lens barrel 3 and the second lens barrel 4 held on the inner peripheral side of the first lens barrel 3. Both the first lens barrel 3 and the second lens barrel 4 are made of resin. Furthermore, the first lens barrel 3 and the second lens barrel 4 are resin injection molded products molded by injecting resin into a mold. The first lens barrel 3 houses the lens L1. The second lens barrel 4 houses the lenses L2 to L6 and the holder 28. The second lens barrel 4 is held on the inner peripheral side of the first lens barrel 3.

First Lens Barrel and Lens L1

Figure 9:
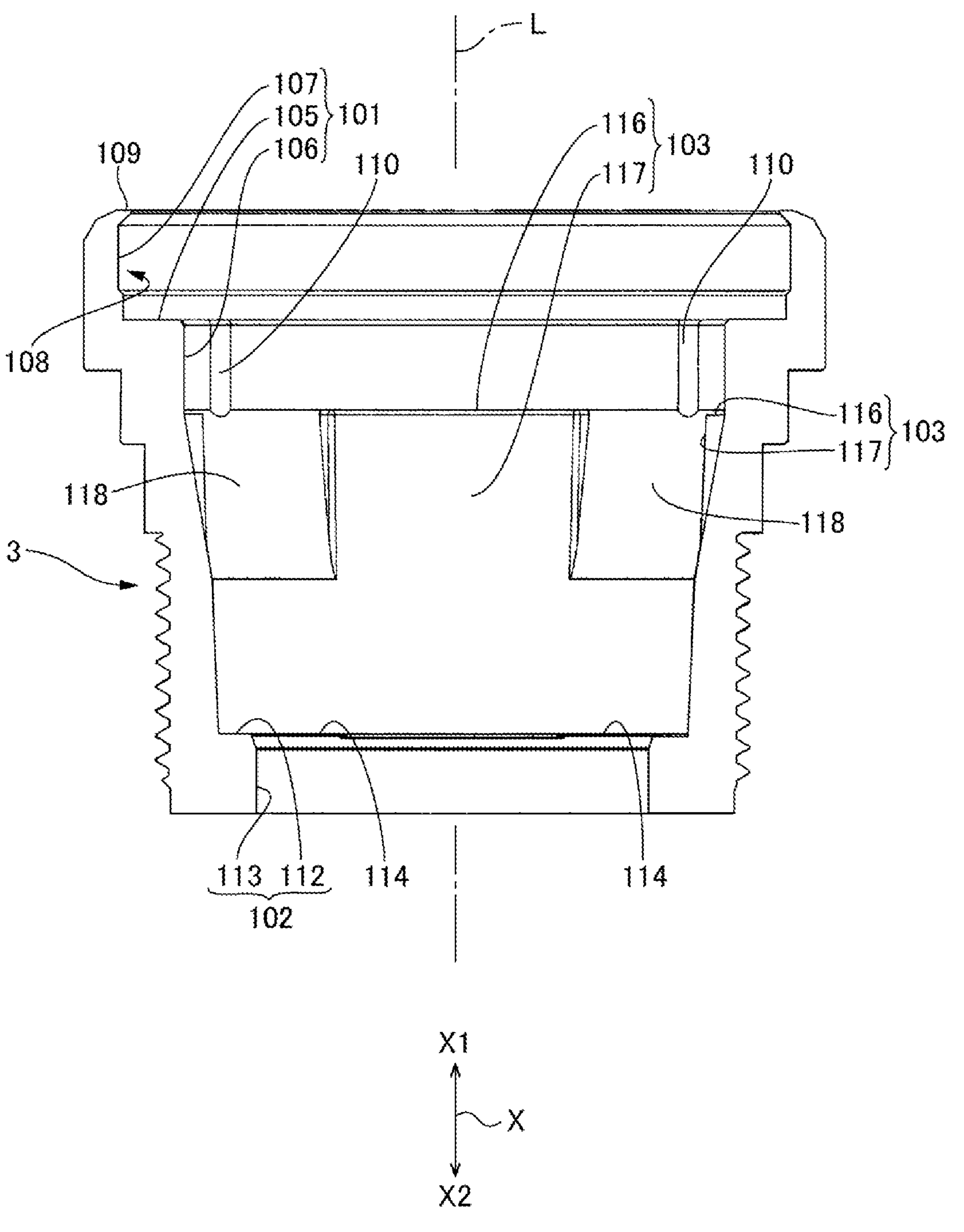
FIG. 9 is a cross-sectional view of a first lens barrel.

FIG. 9 is a cross-sectional view of the first lens barrel 3. The first lens barrel 3 has a cylindrical shape and is located on the outer peripheral side of the lens L2, the lens L3, the lens L4, the holder 28, the lens L5, the lens L6, and the second lens barrel 4. As illustrated in FIGS. 3 and 9, the first lens barrel 3 includes an object-side step portion 101 at an end portion of the inner peripheral surface on the object side X1 and an image-side step portion 102 at an end portion on the image side X2. Further, the first lens barrel 3 includes an intermediate step portion 103 between the object-side step portion 101 and the image-side step portion 102 on the inner peripheral surface in the optical axis direction X.

The object-side step portion 101 includes a support surface 105 facing the object side X1, an annular wall surface 106 that extends from an inner peripheral end of the support surface 105 to the image side X2 and faces inward in the radial direction, and a peripheral wall surface 107 extending from an end of the support surface 105 on the outer peripheral side to the object side X1. In the first lens barrel 3, the object side X1 of the object-side step portion 101 is a housing portion 108 to house an outer peripheral edge portion of the lens L1. The second lens barrel 4 is provided on the inner peripheral side of the annular wall surface 106.

The housing portion 108 includes the peripheral wall surface 107, the support surface 105, and a caulking portion 109. As illustrated in FIG. 2, the peripheral wall surface 107 faces the lens L1 from outside in the radial direction. The support surface 105 faces the end surface 11 of the lens L1 from the image side X2. The caulking portion 109 abuts the lens L1 from the object side X1 at a position overlapped with the support surface 105 when viewed from the optical axis direction X along the optical axis L of the lens L1. The caulking portion 109 is a plastically deformed portion provided by thermal caulking or the like in which an end portion of the first lens barrel 3 on the object side X1 is bent toward the inner peripheral side. Here, the outer peripheral edge portion of the lens L1 is provided between the support surface 105 and the caulking portion 109. The first O-ring 7 is provided between the end surface of the lens L1 on the image side X2 and the support surface 105 and is compressed in the optical axis direction X.

As illustrated in FIG. 3, the annular wall surface 106 includes object-side projections 110 that project inward in the radial direction at a plurality of positions in the circumferential direction. In this example, the object-side projections 110 are provided at three positions in the circumferential direction at equal angular intervals. The object-side projection 110 is an object-side positioning portion that positions the second lens barrel 4 in the radial direction.

Figure 10:
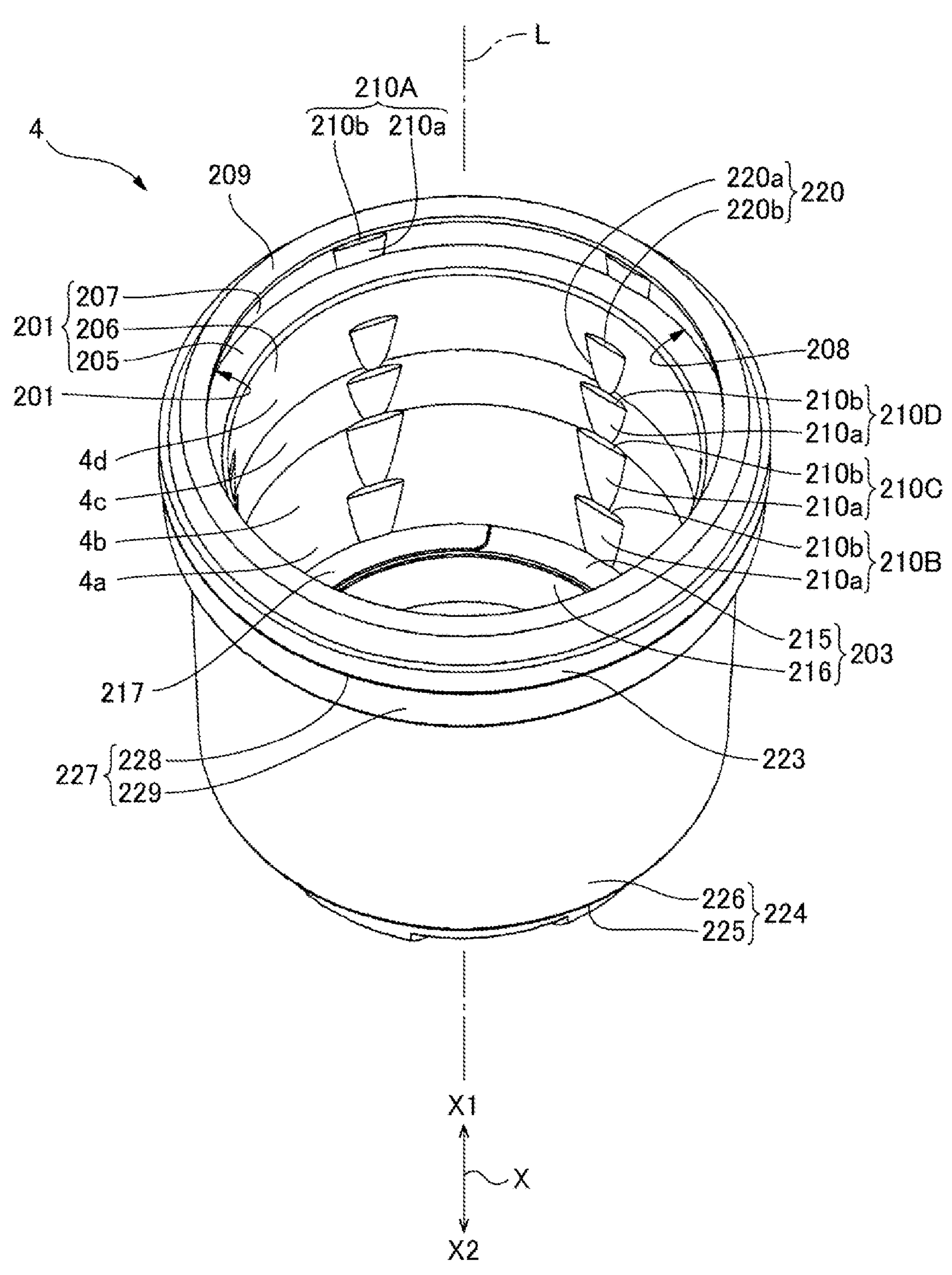
FIG. 10 is a perspective view of a second lens barrel when viewed from the object side.

As illustrated in FIGS. 3 and 10, the image-side step portion 102 includes an annular image-side end surface 112 facing the object side X1 and an annular image-side inner wall surface 113 that extends from the inner peripheral end of the image-side end surface 112 to the image side X2 and reaches the end of the first lens barrel 3 on the image side X2. The image-side end surface 112 includes a plurality of ribs 114 that projects to the object side X1 and extends in a circular arc shape in the circumferential direction. In this example, the ribs 114 are provided at three positions in the circumferential direction at equal angular intervals. The rib 114 is an image-side positioning portion that positions the second lens barrel 4 in the optical axis direction X.

The intermediate step portion 103 includes an annular step portion end surface 116 facing the object side X1 and an annular step portion wall surface 117 extending from the inner peripheral end of the step portion end surface 116 to the image side X2. In this example, the intermediate step portion 103 includes, at a plurality of positions in the circumferential direction, cutout grooves 118 that extend in the optical axis direction X and divide the step portion end surface 116 and the step portion wall surface 117 in the circumferential direction. In this example, the cutout grooves 118 are provided at three positions in the circumferential direction at equal angular intervals. Therefore, the intermediate step portion 103 is divided into three in the circumferential direction by the cutout grooves 118. The bottom surface (surface facing the inner peripheral side) of the cutout groove 118 is a tapered surface, and the inner diameter dimension decreases toward the image side X2. As illustrated in FIG. 2, the bottom surface of the cutout groove 118 is continuous with an inner peripheral surface portion extending from the end on the outer peripheral side of the image-side end surface 112 of the image-side step portion 102 to the object side X1 in the inner peripheral surface of the first lens barrel 3.

Here, as illustrated in FIG. 3, the cutout groove 118 is provided at the same angular position as the rib 114 of the image-side step portion 102. Further, the cutout groove 118 is provided at the same angular position as the object-side projection 110 of the object-side step portion 101. When the first lens barrel 3 and the second lens barrel 4 provided on the inner peripheral side of the first lens barrel 3 are connected to each other, an adhesive is applied to each of the step portion end surfaces 116 of the intermediate step portion 103 divided into three. Accordingly, a lens barrel connecting adhesive layer 51 is provided for the step portion end surface 116 and the step portion wall surface 117.

Second Barrel and Lens L2 to Lens L6

Figure 11:
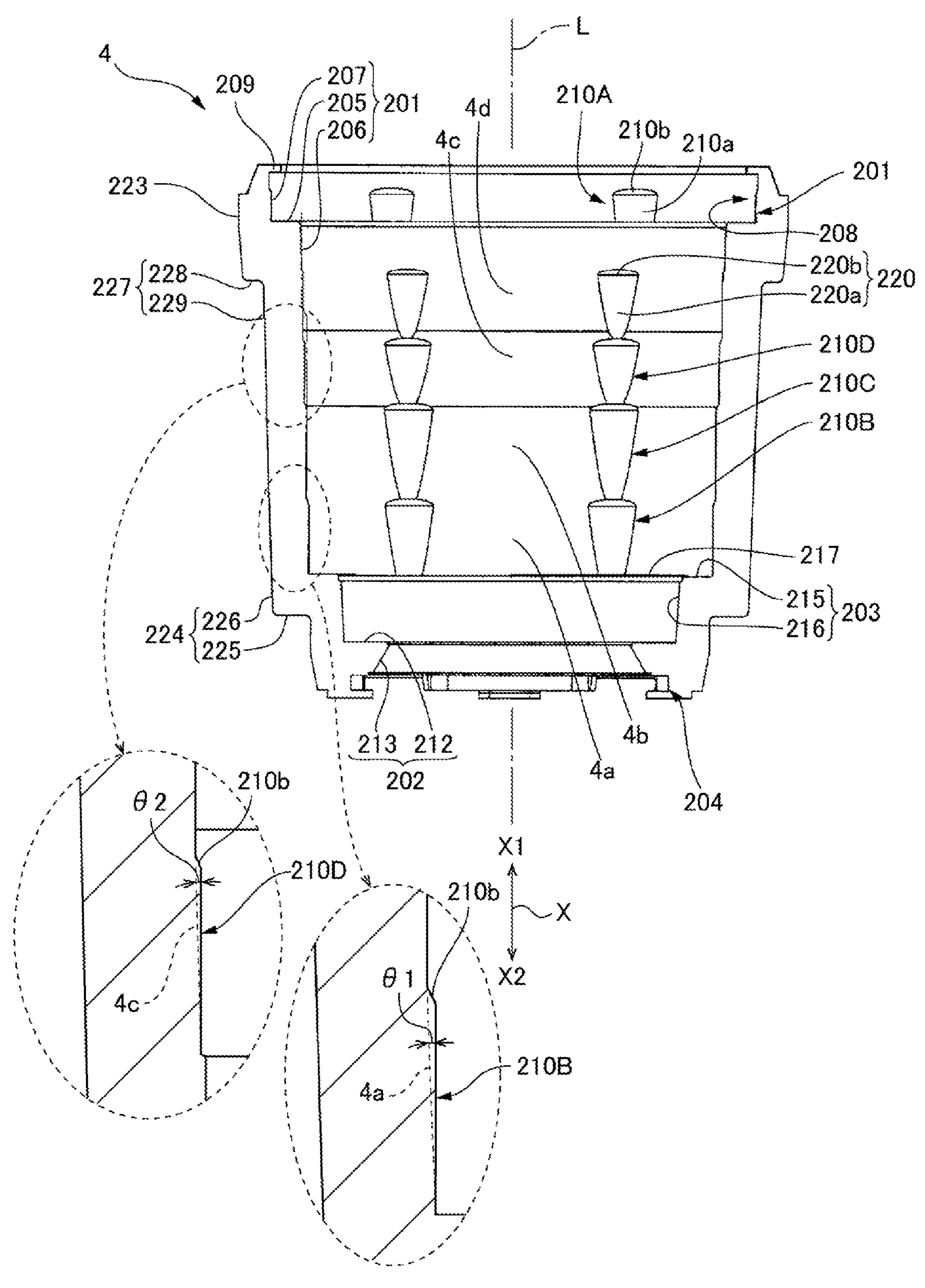
FIG. 11 is a cross-sectional view of the second lens barrel.

FIG. 10 is a perspective view of the second lens barrel 4 when viewed from the object side. FIG. 11 is a cross-sectional view of the second lens barrel 4. The regions surrounded by chain lines in FIG. 11 are partially enlarged views of the periphery of a fitting projection 210. The second lens barrel 4 houses the lens L2, the lens L3, the lens L4, the lens L5, the holder 28, and the lens L6 on the inner peripheral side.

As illustrated in FIGS. 10 and 11, the second lens barrel 4 includes an object-side step portion 201 at an end portion of the inner peripheral surface on the object side X1. The second lens barrel 4 includes an image-side step portion 202 at an end portion on the image side X2. Further, the second lens barrel 4 includes a positioning step portion 203 at a position between the object-side step portion 201 and the image-side step portion 202 and closer to the image-side step portion 202 than the object-side step portion 201. Further, the second lens barrel 4 includes a cover holding portion 204 that holds the cover 10 at an end portion on the object side X1.

As illustrated in FIG. 11, the object-side step portion 201 includes a seat surface 205 facing the object side X1, an annular wall surface 206 extending from an end of the seat surface 205 on the inner peripheral side to the image side X2, and a peripheral wall surface 207 extending from an end of the seat surface 205 on the outer peripheral side to the object side X1. The annular wall surface 206 is a tapered surface whose inner diameter dimension increases toward the object side X1. In the second lens barrel 4, the object side X1 of the object-side step portion 201 is a housing portion 208 to house the outer peripheral edge portion of the lens L2.

The housing portion 208 includes a peripheral wall surface 207, a seat surface 205, and a caulking portion 209. As illustrated in FIG. 2, the peripheral wall surface 207 faces the lens L2 from outside in the radial direction. The seat surface 205 faces the end surface of the flange portion 14 of the lens L2 on the image side X2 from the image side X2. The caulking portion 109 abuts the lens L2 from the object side X1 at a position overlapped with the seat surface 205 when viewed from the optical axis direction X.

As illustrated in FIG. 10, the peripheral wall surface 207 is a tapered surface that is inclined to the outer peripheral side toward the object side X1 from the seat surface 205. The peripheral wall surface 207 includes fitting projections 210A to be pressure-bonded to the lens L2 at a plurality of positions separated in the circumferential direction. In this example, the fitting projections 210A are provided at six positions in the circumferential direction at equal angular intervals. The fitting projection 210A includes a pressure bonding surface 210*a* parallel to the optical axis L at an end on the inner peripheral side. Furthermore, the fitting projection 210A includes a curved surface 210*b* that is curved to the outer peripheral side from the pressure bonding surface 210*a* toward the object side X1. In the plurality of fitting projections 210A, the pressure bonding surfaces 210*a* are pressure-bonded to the lens L2 housed in the housing portion 208 from outside in the radial direction to position the lens L2 in the radial direction.

As illustrated in FIG. 11, the image-side step portion 202 includes an annular image-side end surface 212 facing the object side X1 and an image-side inner wall surface 213 extending from the end of the image-side end surface 212 on the inner peripheral side to the image side X2. The image-side inner wall surface 213 is a tapered surface that is inclined to the outer peripheral side toward the image side X2. As illustrated in FIG. 2, the image-side end surface 212 faces the image-side lens L62 of the lens L6 with a clearance therebetween in the optical axis direction X. The cover holding portion 204 is provided on the outer peripheral side of the image-side inner wall surface 213.

As illustrated in FIGS. 10 and 11, the positioning step portion 203 includes an annular positioning surface 215 facing the object side X1 and a positioning step portion peripheral wall surface 216 extending from an end of the positioning surface 215 on the inner peripheral side to the image side X2. The positioning surface 215 includes a plurality of positioning ribs 217 that projects to the object side X1 and extends in a circular arc shape in the circumferential direction. In this example, the positioning ribs 217 are provided at three positions in the circumferential direction at equal angular intervals. The lower end of the positioning step portion peripheral wall surface 216 reaches the image-side step portion 202 of the image-side end surface 212. The positioning step portion peripheral wall surface 216 faces the image-side lens L62 of the lens L6 with a clearance therebetween in the radial direction.

As illustrated in FIG. 2, the positioning rib 217 is a positioning portion that abuts the flange portion 36 of the object-side lens L61 of the lens L6 from the image side X2 to position the lens L6 in the optical axis direction X. Here, the flange portion 36 of the object-side lens L61 of the lens L6 abuts the positioning portion so that the lens L3 and the stacked body 44 including the lens L4, the holder 28, the lens L5, and the lens L6 are positioned in the optical axis direction X.

More specifically, the holder 28 is supported by the lens L6 from the image side X2 to be positioned at a predetermined position in the optical axis direction X. The lens L4 is supported by the holder 28 from the image side X2 to be positioned at a predetermined position in the optical axis direction X. The lens L5 is in contact with the lens L6 to be positioned in the optical axis direction X and the radial direction. The lens L3 is fitted into the lens L4 to be positioned in the optical axis direction X and the radial direction. Here, when the lens L5 is positioned in the optical axis direction X and the radial direction, the lens L5 and the holder 28 are not in contact with each other. When the lens L3 and the lens L4 are positioned in the optical axis direction X and the radial direction, the lens L3 and the second lens barrel 4 are not in contact with each other. The lens L3, the lens L4, the holder 28, and the lens L5 are positioned between the object-side step portion 201 and the positioning step portion 203 in the optical axis direction X.

As illustrated in FIGS. 10 and 11, in the inner peripheral surface of the second lens barrel 4, an inner peripheral surface portion 4*a* located outside the object-side lens L61 of the lens L6 in the radial direction is a tapered surface inclined to the outer peripheral side toward the object side X1. The inner peripheral surface portion 4*a* includes fitting projections 210B to be pressure-bonded to the lens L6 at a plurality of positions separated in the circumferential direction. The fitting projections 210B are provided at six positions in the circumferential direction at equal angular intervals. The fitting projection 210B includes the pressure bonding surface 210*a* parallel to the optical axis L at an end on the inner peripheral side. Furthermore, the fitting projection 210B includes the curved surface 210*b* that is curved to the outer peripheral side from the pressure bonding surface 210*a* toward the object side X1. In the plurality of fitting projections 210B, the pressure bonding surfaces 210*a* are pressure-bonded to the lens L6 housed in the second lens barrel 4 from outside in the radial direction to position the lens L6 in the radial direction.

Further, in the inner peripheral surface of the second lens barrel 4, an inner peripheral surface portion 4*b* located outside the holder 28 in the radial direction is a tapered surface inclined to the outer peripheral side toward the object side X1. The inner peripheral surface portion 4*b* includes fitting projections 210C to be pressure-bonded to the lens L6 at a plurality of positions separated in the circumferential direction. The fitting projections 210C are provided at six positions in the circumferential direction at equal angular intervals. The fitting projection 210C includes the pressure bonding surface 210*a* parallel to the optical axis L at an end on the inner peripheral side. Furthermore, the fitting projection 210C includes the curved surface 210*b* that is curved to the outer peripheral side from the pressure bonding surface 210*a* toward the object side X1. In the plurality of fitting projections 210C, the pressure bonding surfaces 210*a* are pressure-bonded to the holder 28 housed in the second lens barrel 4 from outside in the radial direction to position the holder 28 in the radial direction.

Further, in the inner peripheral surface of the second lens barrel 4, an inner peripheral surface portion 4*c* located outside the lens L4 in the radial direction is a tapered surface inclined to the outer peripheral side toward the object side X1. The inner peripheral surface portion 4*c* includes fitting projections 210D to be pressure-bonded to the lens L4 at a plurality of positions separated in the circumferential direction. The fitting projections 210D are provided at six positions in the circumferential direction at equal angular intervals. The fitting projection 210D includes the pressure bonding surface 210*a* parallel to the optical axis L at an end on the inner peripheral side. Furthermore, the fitting projection 210D includes the curved surface 210*b* that is curved to the outer peripheral side from the pressure bonding surface 210*a* toward the object side X1. In the plurality of fitting projections 210D, the pressure bonding surfaces 210*a* are pressure-bonded to the lens L4 housed in the second lens barrel 4 from outside in the radial direction to position the lens L4 in the radial direction.

Furthermore, in the inner peripheral surface of the second lens barrel 4, an inner peripheral surface portion 4*d* located outside the lens L3 in the radial direction is a tapered surface inclined to the outer peripheral side toward the object side X1. The inner peripheral surface portion 4*d* located outside the lens L3 in the radial direction is continuous with the image side X2 of the annular wall surface 206 of the object-side step portion 201 without a step. The inner peripheral surface portion 4*d* includes guide projections 220 that guide the lens L3 in the optical axis direction X at a plurality of positions separated in the circumferential direction. The guide projections 220 are provided at six positions in the circumferential direction at equal angular intervals. The guide projection 220 includes a guide surface 220*a* parallel to the optical axis L at an end on the inner peripheral side. Furthermore, the guide projection 220 includes a curved surface 220*b* that is curved to the outer peripheral side from the pressure bonding surface 210*a* toward the object side X1. When the lens L3 is fitted into the lens L4, the plurality of guide projections 220 is located outside the lens L3 in the radial direction, but the plurality of guide projections 220 and the lens L3 are not in contact with each other. The guide surface 220*a* of each of the guide projections 220 and the lens L3 face each other with a slight clearance in the radial direction.

Here, the second O-ring 8 is located on the object side X1 of the plurality of guide projections 220 and is located inside the annular wall surface 206 of the object-side step portion 201 in the radial direction. As illustrated in FIG. 2, the second O-ring 8 is compressed in the optical axis direction X between the lens L2 housed in the housing portion 208 and the lens L3.

As illustrated in FIG. 11, a first inclination angle θ1 at which the tapered inner peripheral surface portion 4*a* located outside the lens L6 in the radial direction is inclined with respect to the optical axis L is different from a second inclination angle θ2 at which the tapered inner peripheral surface portion 4*c* located outside the lens L4 in the radial direction is inclined with respect to the optical axis L. Specifically, the inclinations of the inner peripheral surface portions 4*a* to 4*d* located outside the respective lenses and the holder 28 in the radial direction may be appropriately set in accordance with the outer diameter dimensions of the respective lenses and the holder 28. In the inner peripheral surface of the second lens barrel 4, the inner peripheral surface portion 4*a* located between the object-side step portion 201 and the positioning step portion 203 is inclined to the outer peripheral side toward the object side X1 as a whole.

Next, the second lens barrel 4 includes an annular outer peripheral surface side positioning surface 223 at an end portion of the outer peripheral surface on the object side X1. The outer peripheral surface side positioning surface 223 is located outside the housing portion 208 in the radial direction. The outer peripheral surface side positioning surface 223 faces outward in the radial direction. Further, the second lens barrel 4 includes an outer peripheral surface image-side step portion 224 at the image side X2 portion of the outer peripheral surface. The outer peripheral surface image-side step portion 224 includes an annular surface 225 facing the image side X2 and an outer peripheral surface portion 226 extending from an outer peripheral end of the annular surface 225 to the object side X1. Further, the second lens barrel 4 includes an outer peripheral surface intermediate step portion 227 between an end portion (the outer peripheral surface side positioning surface 223) of the outer peripheral surface on the object side X1 and the outer peripheral surface image-side step portion 224. The outer peripheral surface intermediate step portion 227 includes an annular surface 228 facing the image side X2 and an outer peripheral surface portion 229 extending from an end of the annular surface 228 on the inner peripheral side to the image side X2.

Assembly of Lens Unit

Figure 12:
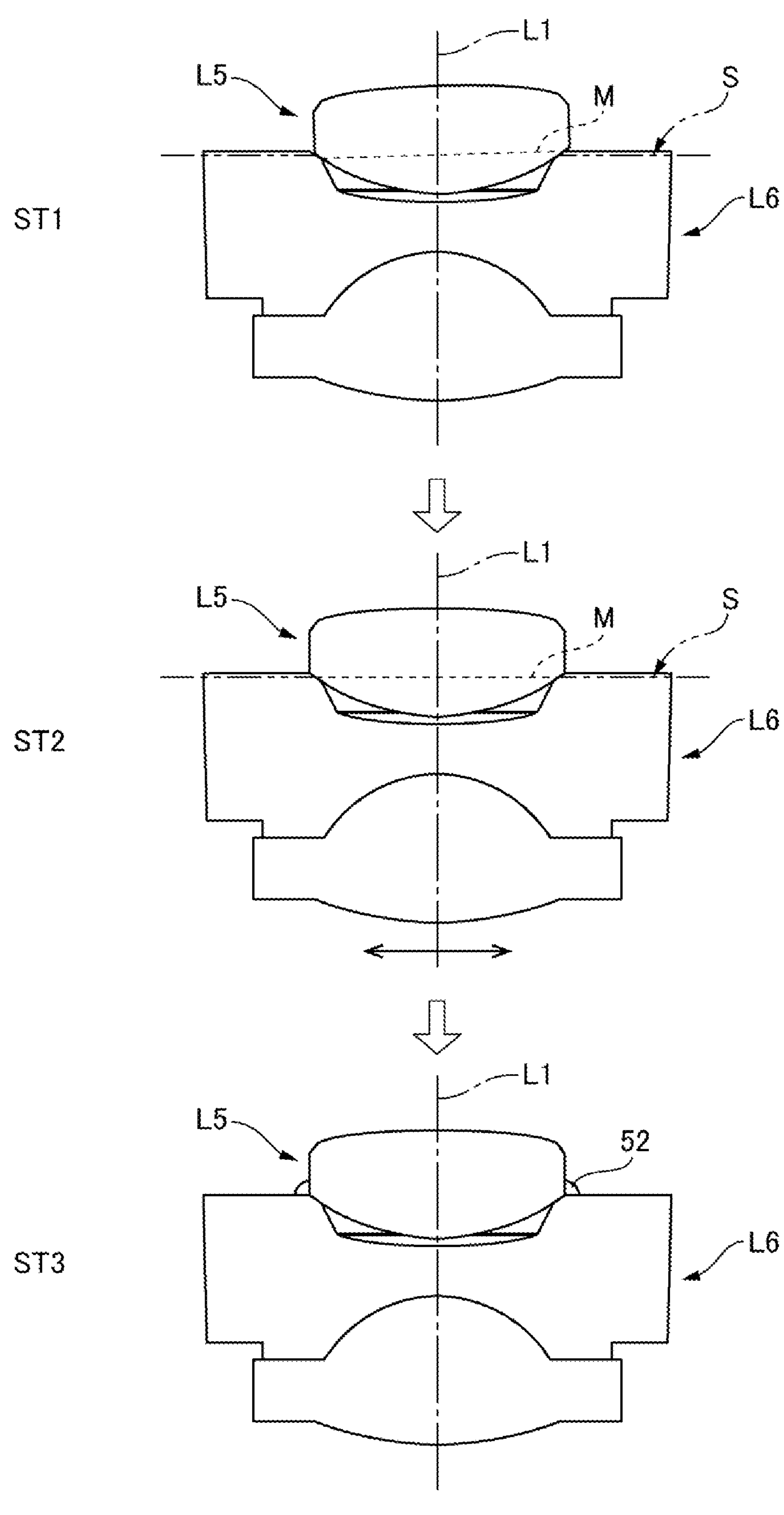
FIG. 12 is an explanatory diagram of a method for aligning the lens L6 and the lens L5.

FIG. 12 is an explanatory diagram of a method for aligning the lens L6 and the lens L5. When the lens unit 1 is assembled, first, a second unit assembling operation is performed to house the lenses L2 to L6 in the second lens barrel 4. Next, a lens barrel fixing operation is performed to hold and fix the second lens barrel 4 to the first lens barrel 3. Then, a first unit assembling operation is performed to house the lens L1 in the first lens barrel 3.

In the second unit assembling operation, as illustrated in FIG. 12, first, the lens L5 is stacked on the lens L6 outside the second lens barrel 4, and the contacting portion 26 of the lens L5 and the contacted portion 37 of the lens L6 are brought into line contact with each other (Step ST1). Then, the lens L6 is vibrated until the annular contact line M along which the contacting portion 26 and the contacted portion 37 are in contact with each other is located on the virtual perpendicular plane S that is coaxial with the optical axis L and is perpendicular to the optical axis L (Step ST2). Here, when the annular contact line M along which the contacting portion 26 and the contacted portion 37 are in contact with each other is located on the virtual perpendicular plane S, which is coaxial with the optical axis L and is perpendicular to the optical axis L, the lens L5 and the lens L6 are aligned. Specifically, the lens L5 and the lens L6 are relatively positioned in the optical axis direction X and the radial direction.

After the alignment is completed, an adhesive is applied between the lens L1 and the lens L2 on the outer peripheral side of the contact line M. Further, the adhesive is cured. Accordingly, the lens L6 and the lens L5 are fixed by an adhesive layer 52 formed therebetween (Step ST3).

Subsequently, the lens L5 and the lens L6, which are fixed to each other, are housed in the second lens barrel 4 from the object side X1. At this time, as can be seen from FIG. 10, the lens L6 is press-fitted to the inner peripheral side of the plurality of fitting projections 210B provided closest to the image side X2 on the inner peripheral surface of the second lens barrel 4. Accordingly, the pressure bonding surface 210*a* of each of the fitting projections 210B is pressure-bonded to the lens L6 (the object-side lens L61) from outside in the radial direction, and the lens L6 is positioned in the radial direction. Further, the flange portion 36 of the object-side lens L61 of the lens L6 abuts the positioning rib 217 of the positioning step portion 203 of the second lens barrel 4. Thus, the lens L6 is positioned in the optical axis direction X. When the lens L6 is positioned in the optical axis direction X and the radial direction, the lens L5 fixed to the lens L6 is also positioned in the optical axis direction X and the radial direction.

Then, the holder 28 is housed in the second lens barrel 4 from the object side X1. At this time, the holder 28 is press-fitted to the inner peripheral side of the plurality of fitting projections 210C, which are the second from the image side X2, on the inner peripheral surface of the second lens barrel 4. Accordingly, the pressure bonding surface 210*a* of each of the fitting projections 210C is pressure-bonded to the holder 28 from outside in the radial direction, and the holder 28 is positioned in the radial direction. Further, the holder 28 abuts the lens L6 from the object side X1, and thus the holder 28 is supported by the lens L6 from the image side X2 and is positioned in the optical axis direction X. Here, the clearances 28*a* are formed among the holder 28, the inner peripheral surface, and the lens L5. Therefore, an adhesive is dropped into the clearances 28*a* to fix the holder 28 and the lens L5 via an adhesive layer 53 (see FIG. 8). In this example, an adhesive is applied to the cutout portion 31 provided at the outer peripheral portion 30 of the holder 28. Accordingly, the adhesive reaches the clearance 28*a* among the holder 28, the inner peripheral surface, and the lens L5 along the central portion 29.

Then, the lens L4 is housed in the second lens barrel 4 from the object side X1. At this time, the lens L4 is press-fitted to the inner peripheral side of the plurality of fitting projections 210D, which are the third from the image side X2, on the inner peripheral surface of the second lens barrel 4. Accordingly, the pressure bonding surface 210*a* of each of the fitting projections 210D is pressure-bonded to the lens L4 from outside in the radial direction, and the lens L4 is positioned in the radial direction. Further, the lens L4 abuts the holder 28 from the object side X1, and thus the lens L4 is supported by the holder 28 from the image side X2 and is positioned in the optical axis direction X. Here, the stacked body 44 including the lens L4, the holder 28, the lens L5, and the lens L6 is formed inside the second lens barrel 4.

Subsequently, the lens L3 is housed in the second lens barrel 4 from the object side X1. At this time, the lens L3 is inserted into the inner peripheral side of the plurality of guide projections 220. Accordingly, the lens L3 is guided in the optical axis direction X in a predetermined posture, and the fitting portion 18 of the lens L3 is inserted into the fitted portion 22 of the lens L4. Furthermore, the lens L3 guided by the guide projection 220 is pushed into the lens L4 from the object side X1. Accordingly, the fitting portion 18 of the lens L3 and the fitted portion 22 of the lens L4 are fitted into each other. In a state where the fitting portion 18 of the lens L3 and the fitted portion 22 of the lens L4 are fitted into each other, the fitting portion tapered surface 18*a* of the fitting portion 18 and the fitted portion tapered surface 22*a* of the fitted portion 22 are in surface contact with each other. Thus, the lens L3 is positioned in the radial direction with respect to the lens L4. Furthermore, in a state where the fitting portion 18 of the lens L3 and the fitted portion 22 of the lens L4 are fitted into each other, the outer peripheral side portion of the fitting portion 18 in the flange portion 17 of the lens L3 and the outer peripheral side portion of the fitted portion 22 in the flange portion 21 of the lens L4 are in contact with each other in the optical axis direction X. Thus, the lens L3 is positioned in the optical axis direction X.

Then, the second O-ring 8 is placed on the flange portion 17 of the lens L3 from the object side X1. Next, the light shielding sheet 9 is supported by the support surface 105. Further, the lens L2 is supported by the support surface 105 via the light shielding sheet 9. At this time, the lens L2 is press-fitted to the inner peripheral side of the fitting projection 210A located closest to the object side X1 on the inner peripheral surface of the second lens barrel 4. Accordingly, the pressure bonding surface 210*a* of each of the fitting projections 210A is pressure-bonded to the lens L2 from outside in the radial direction, and the lens L2 is positioned in the radial direction. Further, the lens L2 abuts the light shielding sheet 9 from the object side X1, and thus the lens L2 is positioned in the optical axis direction X.

Then, the caulking portion 109, which is bent to the inner peripheral side, is formed at the end portion of the second lens barrel 4 on the object side X1, and the caulking portion 109 abuts the outer peripheral edge portion of the lens L2 from the object side X1. In this example, the caulking portion 109 is formed by thermal caulking. Thus, the second unit assembling operation is completed. In a state where the second unit assembling operation is completed, the second O-ring 8 is compressed between the lens L2 and the lens L3 in the optical axis direction X.

Next, the lens barrel fixing operation is performed to hold the second unit 60 on the first unit 50. In the lens barrel fixing operation, as can be seen from FIGS. 3 and 9, an adhesive is applied to each of the step portion end surfaces 116 of the three intermediate step portions 103 provided at the inner peripheral surface of the first lens barrel 3. Then, the second unit 60 is inserted into the inner peripheral side of the first lens barrel 3 from the object side X1. Then, as can be seen from FIGS. 11 and 9, the annular surface 225 of the outer peripheral surface image-side step portion 224 provided at the image-side portion of the outer peripheral surface of the second lens barrel 4 abuts the rib 114 (image-side positioning portion) of the image-side step portion 102 provided at the inner peripheral surface of the first lens barrel 3. Further, the annular outer peripheral surface side positioning surface 223 provided at the end portion of the second lens barrel 4 on the object side X1 abuts the object-side projection 110 provided at the annular wall surface 106 of the object-side step portion 101 of the first lens barrel 3.

Here, the inner peripheral surface of the first lens barrel 3 and the outer peripheral surface of the second lens barrel 4 face each other with a clearance except for a contact part between the image-side step portion 102 of the second lens barrel 4 and the image-side step portion 102 of the first lens barrel 3 and a contact part between the annular positioning surface 215 of the second lens barrel 4 and the object-side step portion 101 of the first lens barrel 3. Therefore, the second lens barrel 4 is positioned in the optical axis direction X and the radial direction with respect to the first lens barrel 3 by the two contact parts.

When the second unit 60 is inserted into the inner peripheral side of the first lens barrel 3, the intermediate step portion 103 on the inner peripheral surface of the first lens barrel 3 and the outer peripheral surface intermediate step portion 227 on the outer peripheral surface of the second lens barrel 4 face each other with a clearance therebetween. Specifically, the step portion end surface 116 of the intermediate step portion 103 of the first lens barrel 3 and the annular surface 228 of the outer peripheral surface intermediate step portion 227 of the second lens barrel 4 face each other with a clearance therebetween in the optical axis direction X. Further, the step portion wall surface 117 of the intermediate step portion 103 of the first lens barrel 3 and the outer peripheral surface portion 229 of the outer peripheral surface intermediate step portion 227 of the second lens barrel 4 face each other with a clearance in the radial direction. Here, the adhesive applied to the step portion end surface 116 of the intermediate step portion 103 of the first lens barrel 3 spreads to the step portion wall surface 117 when the second unit 60 is inserted into the inner peripheral side of the first lens barrel 3. Therefore, as illustrated in FIG. 2, the lens barrel connecting adhesive layer 51 is interposed between the step portion end surface 116 of the intermediate step portion 103 of the first lens barrel 3 and the annular surface 228 of the outer peripheral surface intermediate step portion 227 of the second lens barrel 4. Further, the lens barrel connecting adhesive layer 51 is interposed between the step portion wall surface 117 of the intermediate step portion 103 of the first lens barrel 3 and the outer peripheral surface portion 229 of the outer peripheral surface intermediate step portion 227 of the second lens barrel 4. The intermediate step portion 103 of the first lens barrel 3 and the outer peripheral surface intermediate step portion 227 of the second lens barrel 4 are adhesive fixing portions that connect the first lens barrel 3 and the second lens barrel 4 via the lens barrel connecting adhesive layer 51.

Next, in the first unit assembling operation, the first O-ring 7 is placed on the support surface 105 of the first lens barrel 3. Then, the lens L1 is supported by the support surface 105 via the first O-ring 7. Then, the caulking portion 109, which is bent to the inner peripheral side, is formed at the end portion of the first lens barrel 3 on the object side X1. Accordingly, the caulking portion 109 abuts the outer peripheral edge portion of the lens L1 from the object side X1. In this example, the caulking portion 109 is formed by thermal caulking. When the caulking portion 109 is formed, the first O-ring 7 is compressed in the optical axis direction X between the end surface of the lens L1 on the image side X2 and the support surface 105 of the first lens barrel 3.

Here, when the lens L1 is held by the first lens barrel 3, the annular protruding portion 15 provided at the flange portion 14 of the lens L2 held by the second lens barrel 4 is in surface contact with the end surface 11 of the lens L1 on the image side X2.

As illustrated in FIG. 2, an air path 70 is formed between the first lens barrel 3 and the second lens barrel 4, and the air path 70 passes the gap between an end 3*a* of the first lens barrel 3 on the image side X2 and an end 4*e* of the second lens barrel 4 on the image side X2, the gap between the ribs 114 adjacent to each other in the circumferential direction in the image-side step portion 102 of the first lens barrel 3, the cutout groove 118 provided at the intermediate step portion 103 of the first lens barrel 3, and the gap between the object-side projections 110 adjacent to each other in the circumferential direction on the annular wall surface 106 of the object-side step portion 101 of the first lens barrel 3. The air path 70 communicates with the space between the lens L1 and the support surface 105 and on the inner peripheral side of the first O-ring 7.

Operation Effect

The lens unit 1 in this example includes the lens L6 (first lens) and the lens L5 (second lens) arranged in this order from the image side X2 toward the object side X1. The lens L5 includes the annular contacting portion 26 in contact with the lens L6 on the outer peripheral side of the lens surface on the image side X2. The lens L6 includes the annular contacted portion 37 in contact with the contacting portion 26 on the outer peripheral side of the lens surface on the object side X1. The contacting portion 26 and the contacted portion 37 are in line contact with each other. The contact line M along which the contacting portion 26 and the contacted portion 37 are in contact with each other has an annular shape coaxial with the optical axis L of the lens L6 and is located on the virtual perpendicular plane S that is perpendicular to the optical axis L of the lens L6.

According to this example, the lens L6 and the lens L5 are in contact with each other along the annular contact line M. The contact line M is located on the virtual perpendicular plane S that is perpendicular to the optical axis L of the lens L6. Therefore, the lens L6 and the lens L5 may be aligned with high accuracy.

In this example, the cross-section of the contacting portion 26 cut along the optical axis Lis an arc that is curved to the object side X1 toward the outer peripheral side. The contacted portion 37 is a tapered surface extending to the object side X1 toward the outer peripheral side. Therefore, the lens L6 and the lens L5 may be in line contact with each other.

In this example, in the lens L5, the lens surface on the image side X2 and the contacting portion 26 are continuous with each other without a step. Therefore, the shape of the lens L5 may be simplified. The lens surface of the lens L5 on the image side X2 is the surface of the lens body portion 24 of the lens L5 on the image side X2 and is a portion of the effective diameter of the lens L5 on the image side.

In this example, the lens L6 and the lens L5 are fixed to each other with the adhesive layer 52 (first adhesive layer) provided between the lens L6 and the lens L5 on the outer peripheral side of the contact line M. Specifically, the lens L5 is fixed to the lens L6 with the adhesive.

In this example, the second lens barrel 4 (lens barrel) to house the lens L6 and the lens L5 inside is included. The second lens barrel 4 includes, on the inner peripheral surface, the plurality of fitting projections 210B (first fitting projections) that projects to the inner peripheral side from the inner peripheral surface portion 4*a* (first inner peripheral surface portion) located outside the lens L6 in the radial direction and is pressure-bonded to the lens L6. The lens L6 is positioned in the radial direction by the plurality of fitting projections 210B. The lens L5 is separated to the inner peripheral side from the inner peripheral surface of the second lens barrel 4. Specifically, the lens L6 is positioned in the radial direction by the fitting projections 210B provided at the inner peripheral surface of the second lens barrel 4, but the lens L5 is not in contact with the second lens barrel 4. Thus, the lens L5 may be positioned only by the line contact with the lens L6.

Further, in this example, the lens L4 (third lens) provided on the object side X1 of the lens L5 and the annular holder 28 provided on the outer peripheral side of the lens L5 are included. The lens L6 is supported from the image side X2 at a predetermined position in the optical axis direction X by the positioning rib 217 of the positioning step portion 203 of the second lens barrel 4. The second lens barrel 4 includes, on the inner peripheral surface, the plurality of fitting projections 210C (second fitting projections) that projects to the inner peripheral side from the inner peripheral surface portion 4*b* (second inner peripheral surface portion) located outside the holder 28 in the radial direction and is pressure-bonded to the holder 28. The holder 28 is stacked on the object side X1 of the lens L6 and is positioned in the radial direction by the plurality of fitting projections 210C. A clearance is provided between the lens L5 and the inner peripheral surface of the holder 28. The lens L5 is fixed to the holder 28 with the adhesive layer 53 (second adhesive layer) provided in the clearance. The lens L4 is stacked on the object side X1 of the holder 28. Therefore, the holder 28 located on the outer peripheral side of the lens L5 is positioned in the radial direction by the fitting projections 210C on the inner peripheral surface of the second lens barrel 4, but there is a clearance between the holder 28 and the lens L5. Therefore, the positioning accuracy of the holder 28 does not affect the position of the lens L5 in the radial direction. Here, the holder 28 is stacked on the object side X1 of the lens L6, and the lens L4 is stacked on the object side X1 of the holder 28. Therefore, the holder 28 functions as a member that positions the lens L4 in the optical axis direction X.

Next, the lens alignment method for aligning the lens L6 (first lens) and the lens L5 (second lens) adjacent to each other in the optical axis direction X includes providing the annular contacting portion 26 in contact with the lens L6 on the outer peripheral side of the lens surface of the lens L5 on the lens L6 side, providing the annular contacted portion 37 in contact with the contacting portion 26 on the outer peripheral side of the lens surface of the lens L6 on the lens L5 side, bringing the contacting portion 26 and the contacted portion 37 into line contact with each other, and vibrating one of the lens L6 and the lens L5 until the annular contact line M along which the contacting portion 26 and the contacted portion 37 are in contact with each other is located on the virtual perpendicular plane S that is coaxial with the optical axis L of the lens L6 and is perpendicular to the optical axis L. The cross-section of the contacting portion 26 cut along the optical axis L is an arc that is curved to the object side X1 (in a direction away from the lens L6) toward the outer peripheral side, and the contacted portion 37 is a tapered surface extending to the object side X1 (the lens L5 side) toward the outer peripheral side.

In this example, the lens L6 and the lens L5 are stacked, the contacting portion 26 provided at the lens L6 and the contacted portion 37 provided at the lens L5 are brought into line contact with each other, and one of the lens L6 and the lens L5 is vibrated. Here, the cross-section of the contacting portion 26 cut along the optical axis Lis an arc that is curved to the object side X1 toward the outer peripheral side, and the contacted portion 37 is a tapered surface extending to the object side X1 toward the outer peripheral side. Therefore, one of the lens L6 and the lens L5 is vibrated, and thus the lens L6 and the lens L5 may be relatively moved to align the two lenses.

In this example, after the annular contact line M along which the contacting portion 26 and the contacted portion 37 are in contact with each other is located on the virtual perpendicular plane S, which is perpendicular to the optical axis L of the lens L6, an adhesive may be applied between the lens L6 and the lens L5 on the outer peripheral side of the contact line M to fix the lens L6 and the lens L5.

Other Embodiments

A contacting portion of the lens L5 may be a tapered surface extending to the object side X1 toward the outer peripheral side, and a cross-section of a contacted portion of the lens L6 cut along the optical axis L may be an arc that is curved to the outer peripheral side toward the object side X1. In this case, too, one of the first lens and the second lens is vibrated, and thus the first lens and the second lens may be relatively moved to align the two lenses.

The alignment between the lens L6 and the lens L5 may be performed in a state where these lenses are housed in the second lens barrel 4. In this case, the lens L6 is inserted into the second lens barrel 4, and the lens L6 is positioned in the optical axis direction X and the radial direction. Then, the lens L5 is stacked on the lens L6, and the contacting portion 26 of the lens L5 and the contacted portion 37 of the lens L6 are brought into line contact with each other (Step ST1). Then, the second lens barrel is vibrated until the annular contact line M along which the contacting portion 26 and the contacted portion 37 are in contact with each other is located on the virtual perpendicular plane S that is coaxial with the optical axis L and is perpendicular to the optical axis L. Specifically, the lens L6 is vibrated (Step ST2). An adhesive is applied between the lens L6 and the lens L5 on the outer peripheral side of the contact line M to fix the lens L6 and the lens L5 (Step ST3).

In this case, the holder 28 may be housed in the second lens barrel 4 and positioned in the optical axis direction X and the radial direction before the second lens barrel is vibrated. In this case, too, since there is a clearance between the holder 28 and the lens L5, the lens L6 and the lens L5 may be aligned.

It may also be that the lens L5, the lens L6, and the holder 28 of FIG. 8 are fixed and then housed in the second lens barrel 4.

That is, before the lens L5 and the lens L6, which are fixed to each other, are housed in the second lens barrel 4, the holder 28 abuts the lens L6 from the object side X1. The holder 28 is supported by the lens L6 from the image side X2 and is positioned in the optical axis direction X. Here, the clearances 28*a* are formed among the holder 28, the inner peripheral surface, and the lens L5. An adhesive is applied to the cutout portion 31 provided at the outer peripheral portion 30 of the holder 28. Accordingly, the adhesive reaches the clearance 28*a* among the holder 28, the inner peripheral surface, and the lens L5 along the central portion 29, and the holder 28 and the lens L5 are fixed via the adhesive layer 53.

Then, the lens L5, the lens L6, and the holder 28 are housed in the second lens barrel 4 in a state of being fixed. In this case, the holder 28 is not press-fitted into the inner peripheral surface of the second lens barrel 4, but provided with a clearance. By doing so, the positions of the lens L5 and the holder 28 are not deviated from each other. Alternatively, it may also be that an adhesive is further applied to the abutting portion between the holder 28 and the lens L6 after the holder 28 and the lens L5 are fixed by the adhesive layer 53, thereby fixing the lens L6 and the holder 28.

Figure 13:
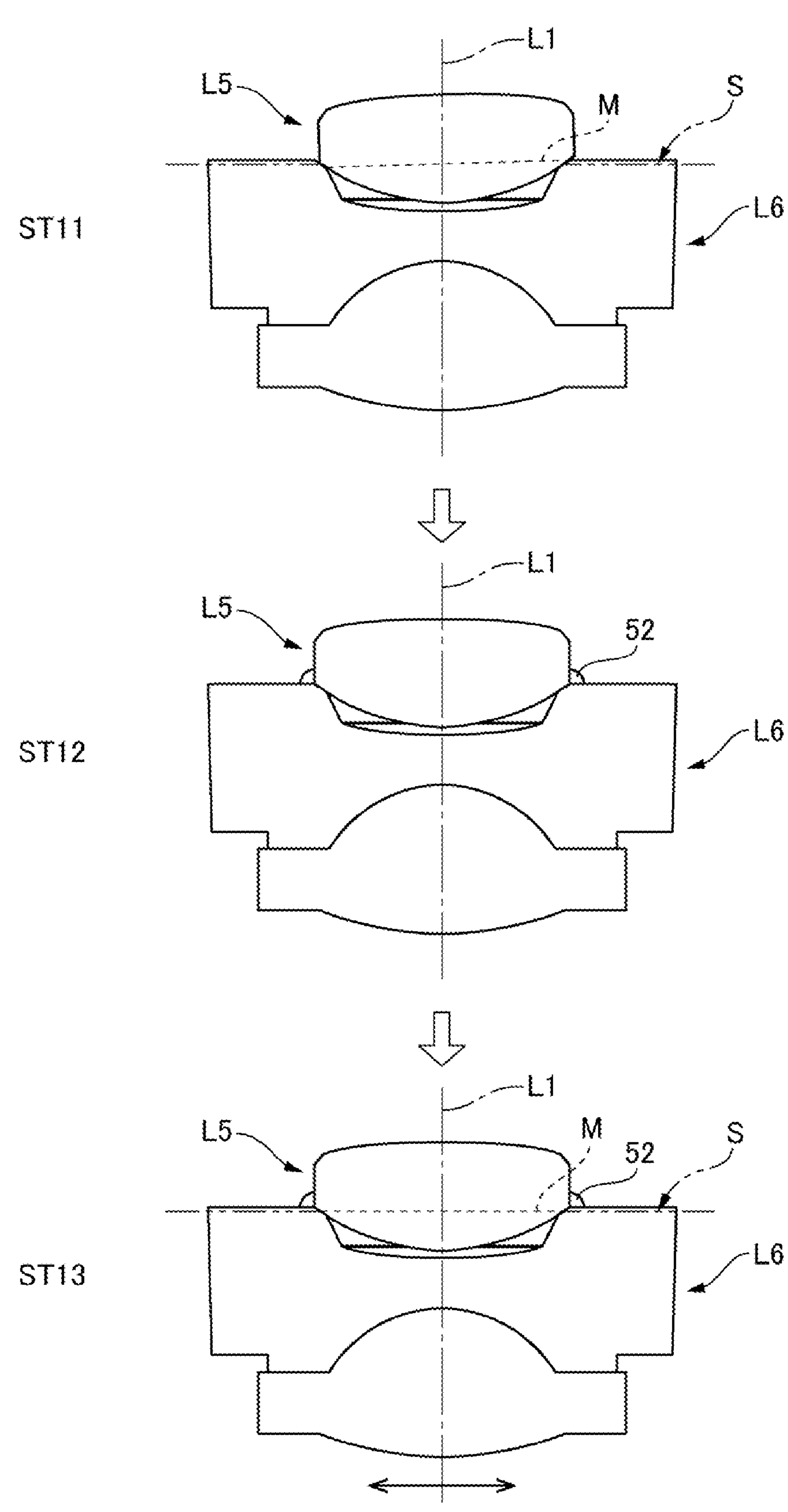
FIG. 13 is an explanatory diagram of another example of the method for aligning the lens L6 and the lens L5.

FIG. 13 is an explanatory diagram of another example of the method for aligning the lens L6 and the lens L5. In the method for aligning the lens L6 and the lens L5 according to this example, as illustrated in FIG. 13, after the contacting portion 26 of the lens L5 and the contacted portion 37 of the lens L6 are brought into line contact with each other (Step ST11), an adhesive is applied between the lens L6 and the lens L5 on the outer peripheral side of the contact line M (Step ST12). Then, the lens L6 is vibrated until the annular contact line M along which the contacting portion 26 and the contacted portion 37 are in contact with each other is located on the virtual perpendicular plane S, which is perpendicular to the optical axis L of the lens L6, and then the adhesive is cured (Step ST13). In this case, too, one of the lens L6 and the lens L5 is vibrated, and thus the lens L6 and the lens L5 may be relatively moved to align the two lenses. Furthermore, the lens L6 and the lens L5 may be fixed by the adhesive layer.

In the above example, the lens L6 is vibrated for alignment, but the lens L6 may be stacked on the lens L5 and the lens L5 may be vibrated for alignment.

This technology may be configured as follows.

(1) A lens unit comprising a first lens and a second lens arranged in this order from an image side toward an object side, wherein the second lens includes an annular contacting portion in contact with the first lens on an outer peripheral side of a lens surface on the image side, the first lens includes an annular contacted portion in contact with the contacting portion on an outer peripheral side of a lens surface on the object side, the contacting portion and the contacted portion are in line contact with each other, and a contact line along which the contacting portion and the contacted portion are in contact with each other has an annular shape coaxial with an optical axis of the first lens and is located on a virtual perpendicular plane that is perpendicular to the optical axis of the first lens.

(2) The lens unit according to (1), wherein a cross-section of the contacting portion cut along the optical axis is an arc that is curved to the object side toward the outer peripheral side, and the contacted portion is a tapered surface extending to the object side toward the outer peripheral side.

(3) The lens unit according to (2), wherein, in the second lens, the lens surface on the image side and the contacting portion are continuous with each other without a step.

(4) The lens unit according to any one of (1) to (3), wherein the first lens and the second lens are fixed to each other with a first adhesive layer provided between the first lens and the second lens on an outer peripheral side of the contact line.

(5) The lens unit according to any one of (1) to (4), further comprising a lens barrel to house the first lens and the second lens inside, wherein the lens barrel includes, on an inner peripheral surface, a plurality of first fitting projections that projects to an inner peripheral side from a first inner peripheral surface portion located outside the first lens in a radial direction and is pressure-bonded to the first lens, the first lens is positioned in the radial direction by the plurality of first fitting projections, and the second lens is separated to the inner peripheral side from the inner peripheral surface of the lens barrel.

(6) The lens unit according to (5), further comprising: a third lens provided on the object side of the second lens; and an annular holder provided on an outer peripheral side of the second lens, wherein the first lens is supported from the image side at a predetermined position in an optical axis direction along the optical axis of the first lens, the lens barrel includes, on the inner peripheral surface, a plurality of second fitting projections that projects to the inner peripheral side from a second inner peripheral surface portion located outside the holder in the radial direction and is pressure-bonded to the holder, the holder is stacked on the object side of the first lens and is positioned in the radial direction by the plurality of second fitting projections, a clearance is provided between the second lens and an inner peripheral surface of the holder, the second lens is fixed to the holder with a second adhesive layer provided in the clearance, and the third lens is stacked on the object side of the holder.

What is claimed is:

1. A lens unit comprising a first lens and a second lens arranged in this order from an image side toward an object side, wherein the second lens includes an annular contacting portion in contact with the first lens on an outer peripheral side of a lens surface on the image side, the first lens includes an annular contacted portion in contact with the contacting portion on an outer peripheral side of a lens surface on the object side, the contacting portion and the contacted portion are in line contact with each other, and a contact line along which the contacting portion and the contacted portion are in contact with each other has an annular shape coaxial with an optical axis of the first lens and is located on a virtual perpendicular plane that is perpendicular to the optical axis of the first lens, wherein a cross-section of the contacting portion cut along the optical axis is an arc that is curved to the object side toward the outer peripheral side, and the contacted portion is a tapered surface extending to the object side toward the outer peripheral side.

2. The lens unit according to claim 1, wherein, in the second lens, the lens surface on the image side and the contacting portion are continuous with each other without a step.

3. The lens unit according to claim 1, wherein the first lens and the second lens are fixed to each other with a first adhesive layer provided between the first lens and the second lens on an outer peripheral side of the contact line.

4. The lens unit according to claim 1, further comprising a lens barrel to house the first lens and the second lens inside, wherein the lens barrel includes, on an inner peripheral surface, a plurality of first fitting projections that projects to an inner peripheral side from a first inner peripheral surface portion located outside the first lens in a radial direction and is pressure-bonded to the first lens, the first lens is positioned in the radial direction by the plurality of first fitting projections, and the second lens is separated to the inner peripheral side from the inner peripheral surface of the lens barrel.

5. The lens unit according to claim 4, further comprising:

a third lens provided on the object side of the second lens; and an annular holder provided on an outer peripheral side of the second lens, wherein the first lens is supported from the image side at a predetermined position in an optical axis direction along the optical axis of the first lens, the lens barrel includes, on the inner peripheral surface, a plurality of second fitting projections that projects to the inner peripheral side from a second inner peripheral surface portion located outside the holder in the radial direction and is pressure-bonded to the holder, the holder is stacked on the object side of the first lens and is positioned in the radial direction by the plurality of second fitting projections, a clearance is provided between the second lens and an inner peripheral surface of the holder, the second lens is fixed to the holder with a second adhesive layer provided in the clearance, and the third lens is stacked on the object side of the holder.

6. The lens unit according to claim 2, wherein the first lens and the second lens are fixed to each other with a first adhesive layer provided between the first lens and the second lens, on an outer peripheral side of the contact line.

7. The lens unit according to claim 6, further comprising a lens barrel to house the first lens and the second lens inside, wherein the lens barrel includes, on an inner peripheral surface, a plurality of first fitting projections that projects to an inner peripheral side from a first inner peripheral surface portion located outside the first lens in a radial direction and is pressure-bonded to the first lens, the first lens is positioned in the radial direction by the plurality of first fitting projections, and the second lens is separated to the inner peripheral side from the inner peripheral surface of the lens barrel.

8. The lens unit according to claim 7, further comprising:

a third lens provided on the object side of the second lens; and an annular holder provided on an outer peripheral side of the second lens, wherein the first lens is supported from the image side at a predetermined position in an optical axis direction along the optical axis of the first lens, the lens barrel includes, on the inner peripheral surface, a plurality of second fitting projections that projects to the inner peripheral side from a second inner peripheral surface portion located outside the holder in the radial direction and is pressure-bonded to the holder, the holder is stacked on the object side of the first lens and is positioned in the radial direction by the plurality of second fitting projections, a clearance is provided between the second lens and an inner peripheral surface of the holder, the second lens is fixed to the holder with a second adhesive layer provided in the clearance, and the third lens is stacked on the object side of the holder.

9. A lens alignment method for aligning a first lens and a second lens adjacent to each other in an optical axis direction, the lens alignment method comprising:

providing an annular contacting portion in contact with the first lens on an outer peripheral side of a lens surface of the second lens on the first lens side and providing an annular contacted portion in contact with the contacting portion on an outer peripheral side of a lens surface of the first lens on the second lens side, bringing the contacting portion and the contacted portion into line contact with each other; and vibrating one of the first lens and the second lens until an annular contact line along which the contacting portion and the contacted portion are in contact with each other is located on a virtual perpendicular plane that is coaxial with an optical axis of the first lens and is perpendicular to the optical axis, wherein a cross-section of the contacting portion cut along the optical axis is an arc that is curved in a direction away from the first lens toward the outer peripheral side, and the contacted portion is a tapered surface extending to the second lens side toward the outer peripheral side.

10. The lens alignment method according to claim 9, further comprising, after the annular contact line along which the contacting portion and the contacted portion are in contact with each other is located on the virtual perpendicular plane, which is perpendicular to the optical axis of the first lens, applying an adhesive between the first lens and the second lens on an outer peripheral side of the contact line to fix the first lens and the second lens.

11. The lens alignment method according to claim 9, further comprising:

after bringing the contacting portion and the contacted portion into line contact with each other, applying an adhesive between the first lens and the second lens on the outer peripheral side of the contact line;

subsequently vibrating one of the first lens and the second lens until the annular contact line along which the contacting portion and the contacted portion are in contact with each other is located on the virtual perpendicular plane that is perpendicular to the optical axis of the first lens; and then curing the adhesive.

* * * * *